(12) United States Patent
Hagiwara

(10) Patent No.: US 11,237,353 B2
(45) Date of Patent: Feb. 1, 2022

(54) LENS DRIVING DEVICE, CAMERA DEVICE, AND ELECTRONIC APPARATUS

(71) Applicant: New Shicoh Motor Co., Ltd., Zhejiang (CN)

(72) Inventor: Kazuyoshi Hagiwara, Kanagawa (JP)

(73) Assignee: New Shicoh Motor Co., Ltd., Zhejiang (CN)

( * ) Notice: Subject to any disclaimer, the term of this patent is extended or adjusted under 35 U.S.C. 154(b) by 154 days.

(21) Appl. No.: 16/143,749

(22) Filed: Sep. 27, 2018

(65) Prior Publication Data

US 2020/0183123 A1 Jun. 11, 2020

(30) Foreign Application Priority Data

Oct. 10, 2017 (JP) .............................. JP2017-196869

(51) Int. Cl.
*G02B 7/09* (2021.01)
*G03B 13/36* (2021.01)

(52) U.S. Cl.
CPC ............... *G02B 7/09* (2013.01); *G03B 13/36* (2013.01)

(58) Field of Classification Search
CPC ... G02B 7/09; G02B 7/02; G02B 7/04; G02B 7/021; G02B 7/023; G02B 13/32; G02B 13/24; G02B 13/26
See application file for complete search history.

(56) References Cited

U.S. PATENT DOCUMENTS

2007/0195438 A1 8/2007 Paik et al.
2008/0253003 A1* 10/2008 Shin ....................... G02B 7/102
359/824
2010/0053784 A1 3/2010 Kang et al.
2017/0285443 A1* 10/2017 Hu ............................ G03B 5/04
2018/0011279 A1* 1/2018 Nishide .................. G02B 7/102
2018/0164660 A1* 6/2018 Hu ............................ G02B 7/04
(Continued)

FOREIGN PATENT DOCUMENTS

| JP | 08-86949 | 4/1996 |
|---|---|---|
| JP | 2000-275494 | 10/2000 |
| JP | 2007-226234 | 9/2007 |

(Continued)

OTHER PUBLICATIONS

Japanese Office Action dated Aug. 19, 2019 in corresponding Japanese Application No. 2017-196869 and English translation.
(Continued)

*Primary Examiner* — Christopher Stanford
*Assistant Examiner* — Journey F Sumlar
(74) *Attorney, Agent, or Firm* — Fildes & Outland, P.C.

(57) ABSTRACT

A lens driving device being capable of stabilizing a motion of a lens holder is provided. A lens driving device includes a lens holder configured to support a lens, a frame surrounding a periphery of the lens holder, and a support mechanism configured to support the lens holder so as to be freely movable relative to the frame in an optical axis direction of the lens. The support mechanism includes a support member provided in the frame and a guide portion provided in the lens holder. The support member extends in the optical axis direction of the lens, and the support member is in contact with the guide portion at least at two points in a cross section orthogonal to the optical axis direction of the lens.

13 Claims, 22 Drawing Sheets

(56) References Cited

U.S. PATENT DOCUMENTS

2018/0172946 A1* 6/2018 Fuse .................. G03B 13/36

FOREIGN PATENT DOCUMENTS

| JP | 2008-129111 | 6/2008 |
|----|-------------|--------|
| JP | 2010-204403 | 9/2010 |
| JP | 2011-145426 | 7/2011 |
| JP | 2015-219410 | 12/2015 |
| JP | 2016-122044 | 7/2016 |

OTHER PUBLICATIONS

English language machine translation of JP 2011-145426.
English language machine translation of JP 2016-122044.
English language machine translation of JP 2000-275494.
English language machine translation of JP 2008-129111.
English language machine translation of JP 2010-204403.
English language abstract and machine translation of JP 08-86949.
Japanese Office Action dated Mar. 3, 2020 in corresponding Japanese Application No. 2017-196869 and English translation.
English language machine translation of JP 2015-219410.

* cited by examiner

LENS DRIVING DEVICE, CAMERA DEVICE, AND ELECTRONIC APPARATUS

TECHNICAL FIELD

The present invention relates to a lens driving device, a camera device, and an electronic apparatus.

BACKGROUND ART

A small-sized camera is mounted on an electronic apparatus, e.g., a mobile phone or a smart phone. As this type of small-sized camera, for example, as disclosed in Japanese Patent Application Laid-open No. Hei 08-86949, US 2010/0053784, and US 2008/0253003, there is known a small-sized camera having an auto-focus function.

SUMMARY

Problems to be Solved by the Invention

In Japanese Patent Application Laid-open No. Hei 08-86949, US 2010/0053784, and US 2008/0253003, the camera includes a lens holder configured to support a lens, and a frame surrounding a periphery of the lens holder. In order to support the lens holder so as to be freely movable relative to the frame, a plurality of balls are used. Further, the related-art lens driving device includes a magnet and a magnetic member provided so as to be opposed to the magnet. An attraction force generated between the magnet and the magnetic member causes the balls to be sandwiched between the lens holder and the frame.

However, when a force larger than the attraction force is applied between the magnet and the magnetic member due to, for example, falling, the lens holder may be separated from the balls, and then the lens holder may hit the balls again. The frame that is brought into point contact with the balls receives the impact, and thus there have been problems in that a dent or a crack may occur in a ball hitting part and smooth movement of the lens holder may not be ensured.

The present invention has been made to solve the above-mentioned problems in the related art, and has an object to provide a lens driving device, a camera device, and an electronic apparatus, which are capable of ensuring smooth movement of a lens holder.

Means for Solving the Problem

In one aspect of the present invention is a lens driving device. The lens driving device includes: a lens holder configured to support a lens; a frame surrounding a periphery of the lens holder; and a support mechanism configured to support the lens holder so as to be freely movable relative to the frame in an optical axis direction of the lens, the support mechanism including a support member provided in the frame and a guide portion provided in the lens holder, the support member extending in the optical axis direction of the lens and being in contact with the guide portion at least at two points in a cross section orthogonal to the optical axis direction of the lens.

Preferably, the guide portion includes protruding portions each having a curved shape and protruding toward the support member, and the protruding portions are in contact with the support member.

Preferably, the support member includes a first support member and a second support member provided so as to be separated from the first support member in a direction orthogonal to the optical axis direction of the lens, and the guide portion includes a first guide portion and a second guide portion provided so as to be separated from the first guide portion in the direction orthogonal to the optical axis direction of the lens.

Preferably, the lens driving device further includes: a coil provided on one of the frame and the lens holder; and a magnet provided on another of the frame and the lens holder so as to be opposed to the coil, the first support member and the first guide portion are provided on one side of the coil and the magnet, and the second support member and the second guide portion are provided on another side of the coil and the magnet.

Preferably, the first guide portion includes a first contact portion and a second contact portion, which are separated from each other in the optical axis direction of the lens, and are brought into contact with the first support member, and the second guide portion includes a third contact portion, which is brought into contact with the second support member between the first contact portion and the second contact portion in the optical axis direction of the lens.

Preferably, the magnet is arranged at a position including a center of gravity of an imaginary triangle formed by the first contact portion, the second contact portion, and the third contact portion.

Preferably, at least a part of an outer surface of the first support member includes at least a part of a circle of 180 degrees or more so that the first support member is brought into contact with the first guide portion at least at 180 degrees or more, and the second support member is brought into contact with the second guide portion at least at two points.

Preferably, the frame further includes a magnetic member configured to arrange the coil between the frame and the magnetic member, and the magnetic member is configured to support one end of the support member.

Preferably, the support member is supported via a rib extending from the frame.

Preferably, the support member and the rib are formed integrally with the frame.

Preferably, the rib includes a plurality of ribs provided in a plurality of support members, and the plurality of ribs are oriented in different directions in the direction orthogonal to the optical axis direction of the lens.

Preferably, the lens driving device further includes an adjuster configure to adjust an inclination angle of the support member with respect to the frame.

Preferably, the adjuster includes a pressing member configured to press the support member in the direction orthogonal to the optical axis direction of the lens.

Preferably, the adjuster includes a pressing force receiving portion, which is provided on an opposite side of a pressing direction of the pressing member, and is configured to receive a pressing force of the pressing member.

Preferably, the adjuster includes an inclination receiving portion, which is provided in the frame, and is configured to receive the support member so as to be freely inclinable.

Preferably, the adjuster includes a semi-spherical inclination received portion formed at one end of the support member, and the semi-spherical inclination received portion is in contact with the inclination receiving portion.

Preferably, the adjuster includes a support spring portion, which is provided in the frame, and is configured to support another end of the support member.

Another aspect of the present invention is a camera device. The camera device includes: the lens driving device of the above aspects; and a lens supported by the lens holder.

Another aspect of the present invention is an electronic apparatus. The electronic apparatus includes the camera device of the above aspect.

Advantageous Effect

According to the present invention, the support member is configured to extend in the optical axis direction of the lens, and the support member is brought into contact with the guide portion at least at two points in the cross section orthogonal to the optical axis direction of the support. Therefore, the lens holder receives less impact in the direction orthogonal to the optical axis direction of the lens, and the smooth movement of the lens holder can be ensured.

EXEMPLARY EMBODIMENT OF THE PRESENT INVENTION

Figure 1:
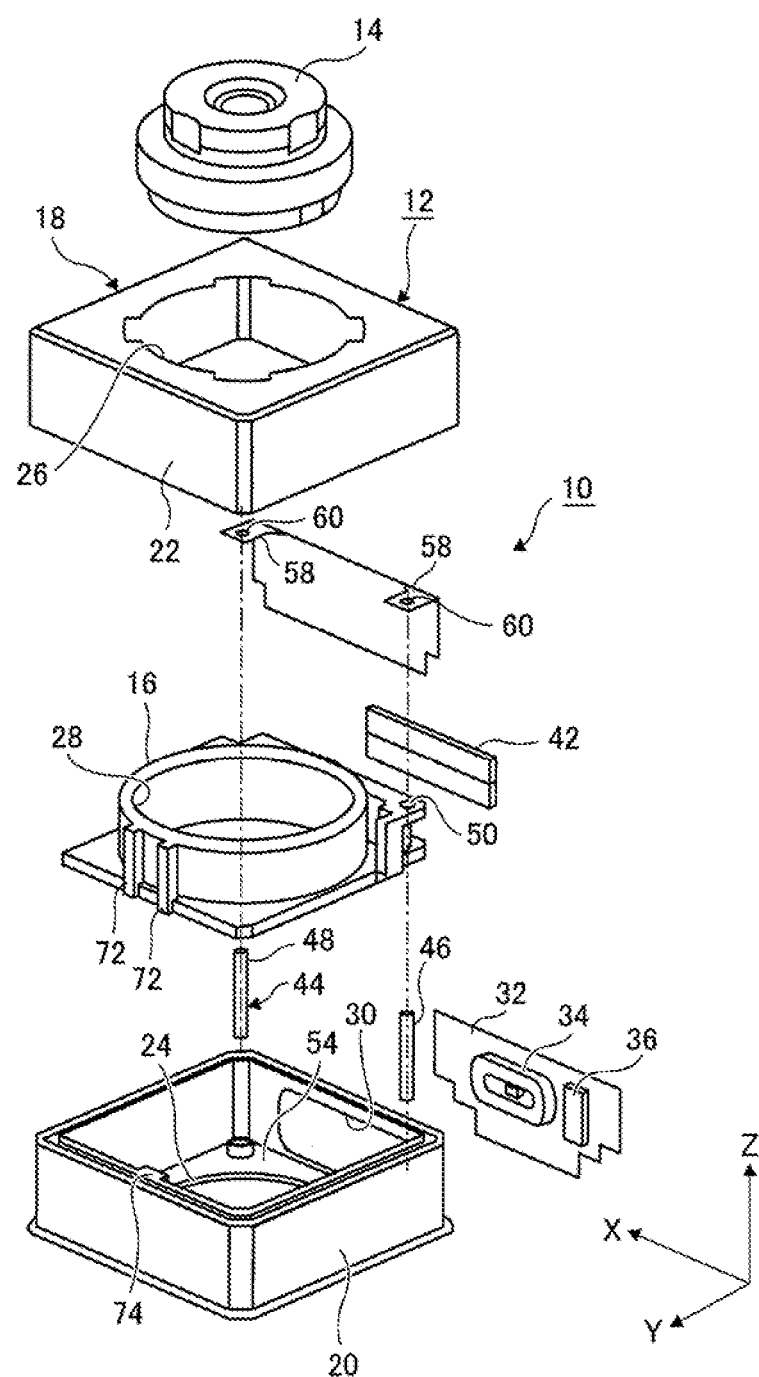
FIG. 1 is an exploded perspective view for illustrating a camera device according to a first embodiment of the present invention as viewed obliquely from above.
Figure 2:
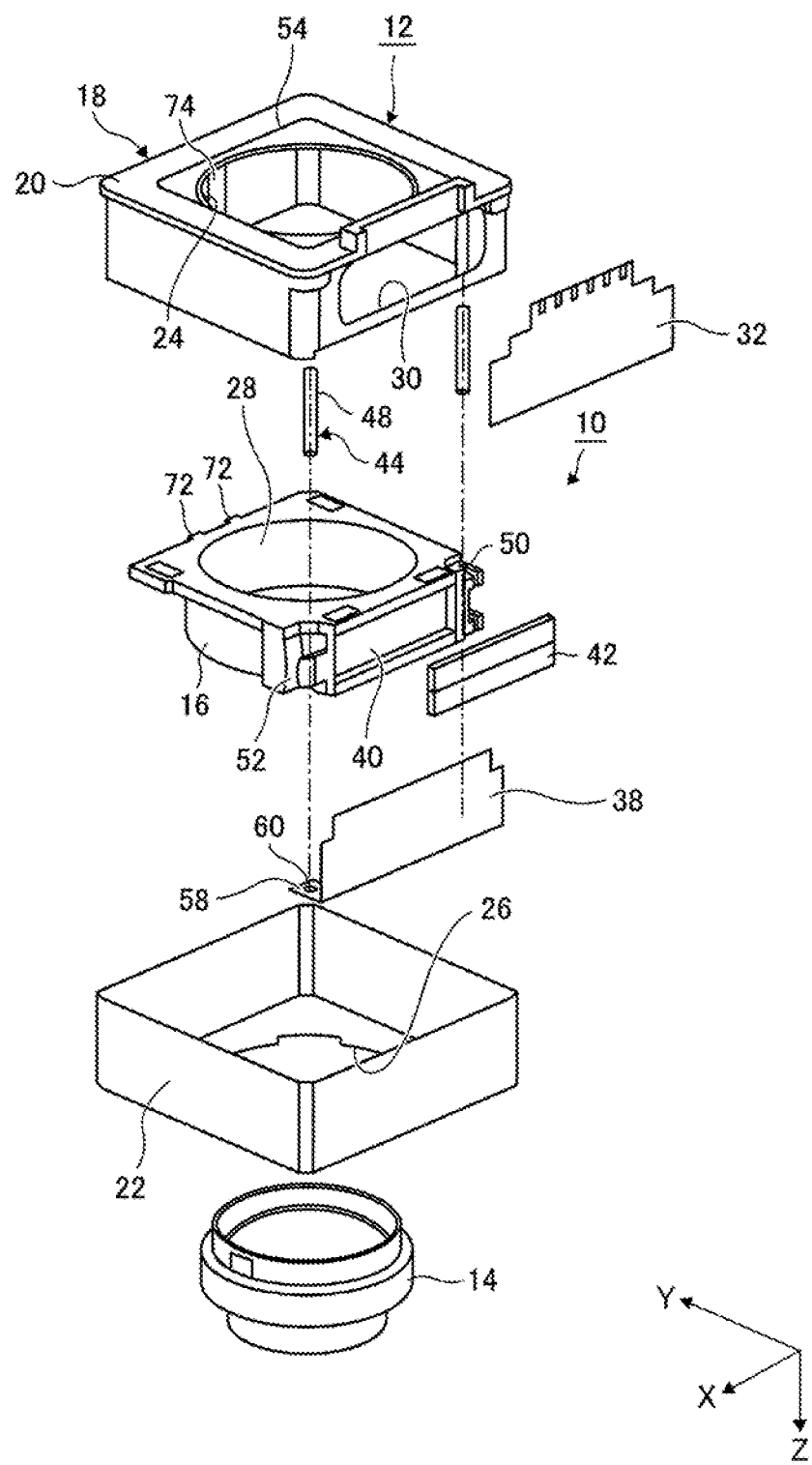
FIG. 2 is an exploded perspective view for illustrating the camera device according to the first embodiment of the present invention as viewed obliquely from below.

Embodiments of the present invention are described with reference to the drawings.

FIG. 1 to FIG. 8 are illustrations of a camera device 10 according to a first embodiment of the present invention. The camera device 10 includes a lens driving device 12 and a lens 14 mounted to the lens driving device 12.

The lens driving device 12 includes a lens holder 16 serving as a movable member and a frame 18 serving as a fixed member. The frame 18 includes a base 20 and a cover 22. The base 20 and the cover 22 are each made of a resin or a non-magnetic metal, and each have a square shape as viewed from above. The cover 22 is fitted to the outer side of the base 20 to form the frame 18. Further, through holes 24 and 26 are formed through the base 20 and the cover 22, respectively, in order to allow light to pass therethrough or introduce the lens 14.

For the sake of convenience, an optical axis direction of the lens 14 is herein referred to as "Z direction", a direction orthogonal to the optical axis direction is referred to as "X direction", and a direction orthogonal to the Z direction and the X direction is referred to as "Y direction". Further, an object side of an optical axis is referred to as "upper side", and a side which is opposite to the upper side and on which an image sensor (not shown) is to be arranged is referred to as "lower side".

The lens holder 16 is made of a resin, and the periphery of the lens holder 16 is surrounded by the frame 18. On the inner side of the lens holder 16, a lens mounting hole 28 having a circular shape as viewed in the Z direction is formed, and the lens 14 is mounted to the lens mounting hole 28.

Further, an opening 30 is formed through one side surface of the base 20. A flexible printed board 32 is arranged on the outer side of the base 20 so as to surround the opening 30. On an inner surface of the flexible printed board 32, a coil 34 is fixed at the center, and a position detector 36 is fixed on any one of the right side and the left side of the coil 34. The coil 34 is connected so as to be supplied with an electric current via the flexible printed board 32. Further, the coil 34 is formed of linear sections and semi-circular sections so that an electric current flows in a +X direction and a −X direction. The position detector 36 includes, for example, a Hall element and a drive circuit configured to drive the Hall element. The position detector 36 detects the position of the lens holder 16 in the Z direction based on change in density of magnetic fluxes from a magnet 42 which is described later. The coil 34 and the position detector 36 face the inner side of the base 20 through the opening 30.

Further, on the outer side of the flexible printed board 32, a magnetic member 38 made of a magnetic substance is arranged. The magnetic member 38 is fixed to the base 20 through intermediation of the flexible printed board 32.

Meanwhile, in a side surface of the lens holder 16 opposed to the opening 30, a magnet fixing groove 40 is formed. The magnet 42 is inserted and fixed to the magnet fixing groove 40. The magnet 42 is formed into a rectangular shape that is long in the X direction, and an N pole and an S pole are arranged in the Z direction. The coil 34 and the position detector 36 are opposed to the magnet 42 in the Y direction. Further, the magnet 42 is opposed to the magnetic member 38 through intermediation of the flexible printed board 32 and the coil 34. With an attraction force in the Y direction generated between the magnet 42 and the magnetic member 38, the lens holder 16 which fixes the magnet 42 is attracted in the Y direction to the base 20 which fixes the magnetic member 32.

The lens holder 16 is supported by a support mechanism 44 so as to be freely movable relative to the frame 18 in the Z direction. The support mechanism 44 includes a first support member 46 and a second support member 48 provided in the frame 18, and a first guide portion 50 and a second guide portion 52 provided in the lens holder 16. The first support member 46 and the first guide portion 50 are combined with each other, and the second support member 48 and the second guide portion 52 are combined with each other.

Each of the first support member 46 and the second support member 48 is made of, for example, a ceramic, a metal, or a resin, and in the first embodiment, is formed as a column shaped member extending in the Z direction. Further, the first support member 46 and the second support member 48 are provided away from each other in the X direction in the vicinity of corner portions of the base 20 on a side-surface inner side on the magnet 42 side.

Each of the first support member 46 and the second support member 48 has a circular shape in an XY-direction cross section, but may have a shape of a part of a circle, or an oval or polygonal shape other than the circular shape.

Figure 5:
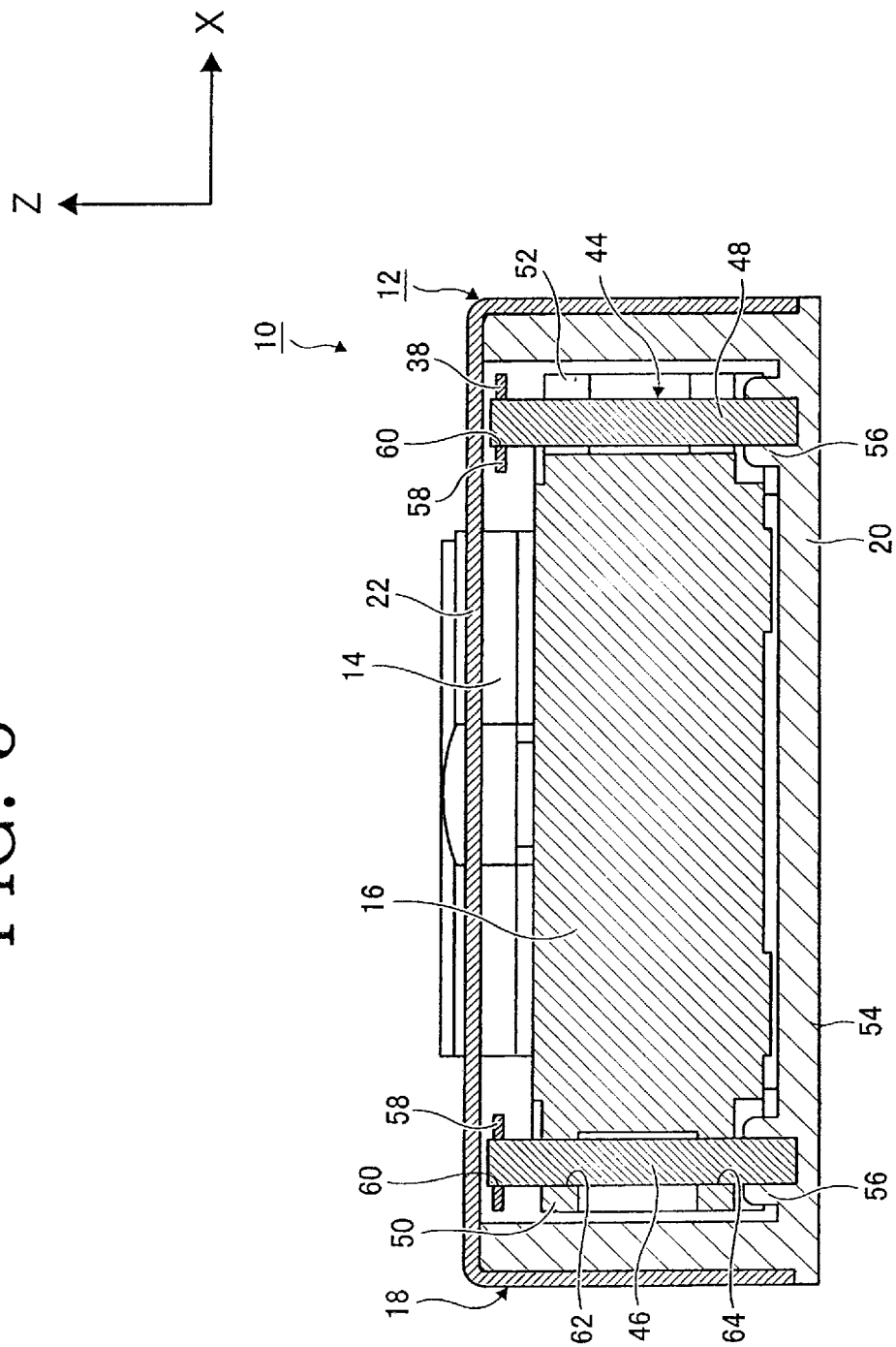
FIG. 5 is a sectional view for illustrating the camera device according to the first embodiment of the present invention, which is taken along the line B-B of FIG. 3.
Figure 6:
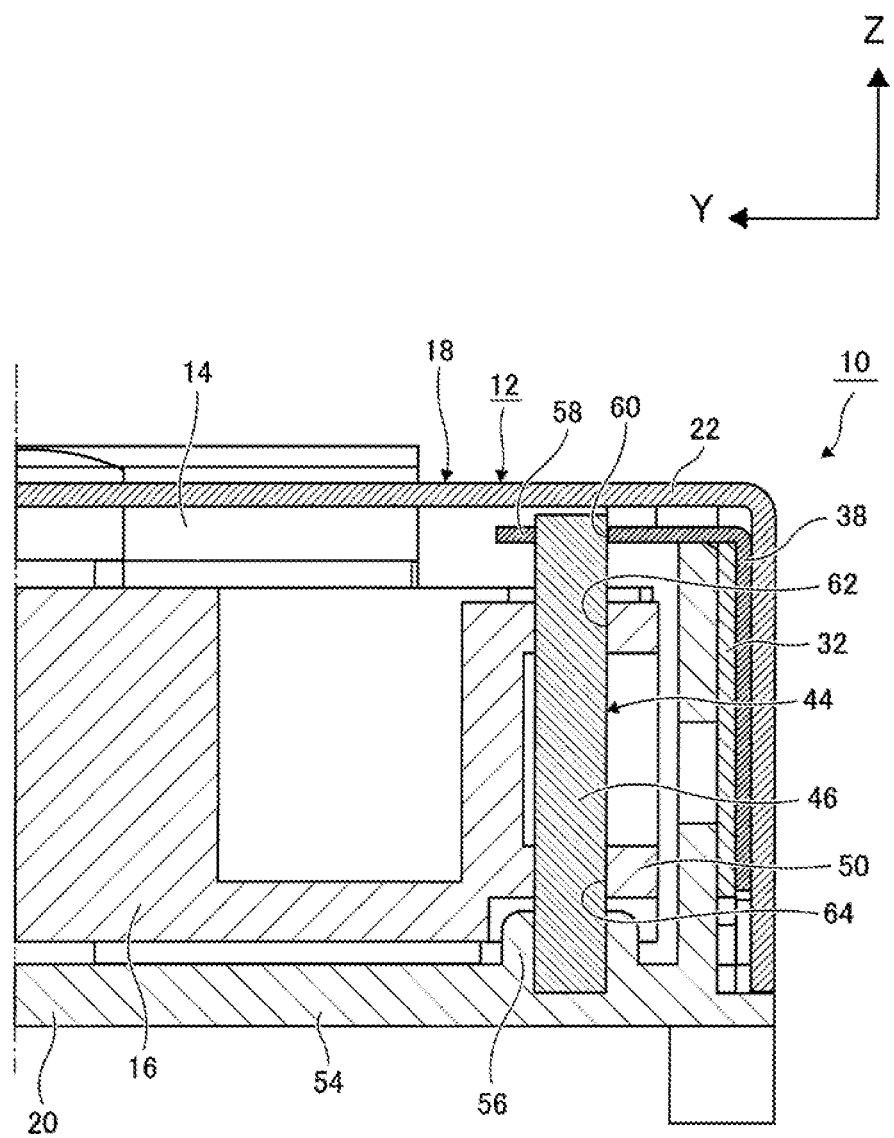
FIG. 6 is a sectional view for illustrating the camera device according to the first embodiment of the present invention, which is taken along the line C-C of FIG. 3.
Figure 7:
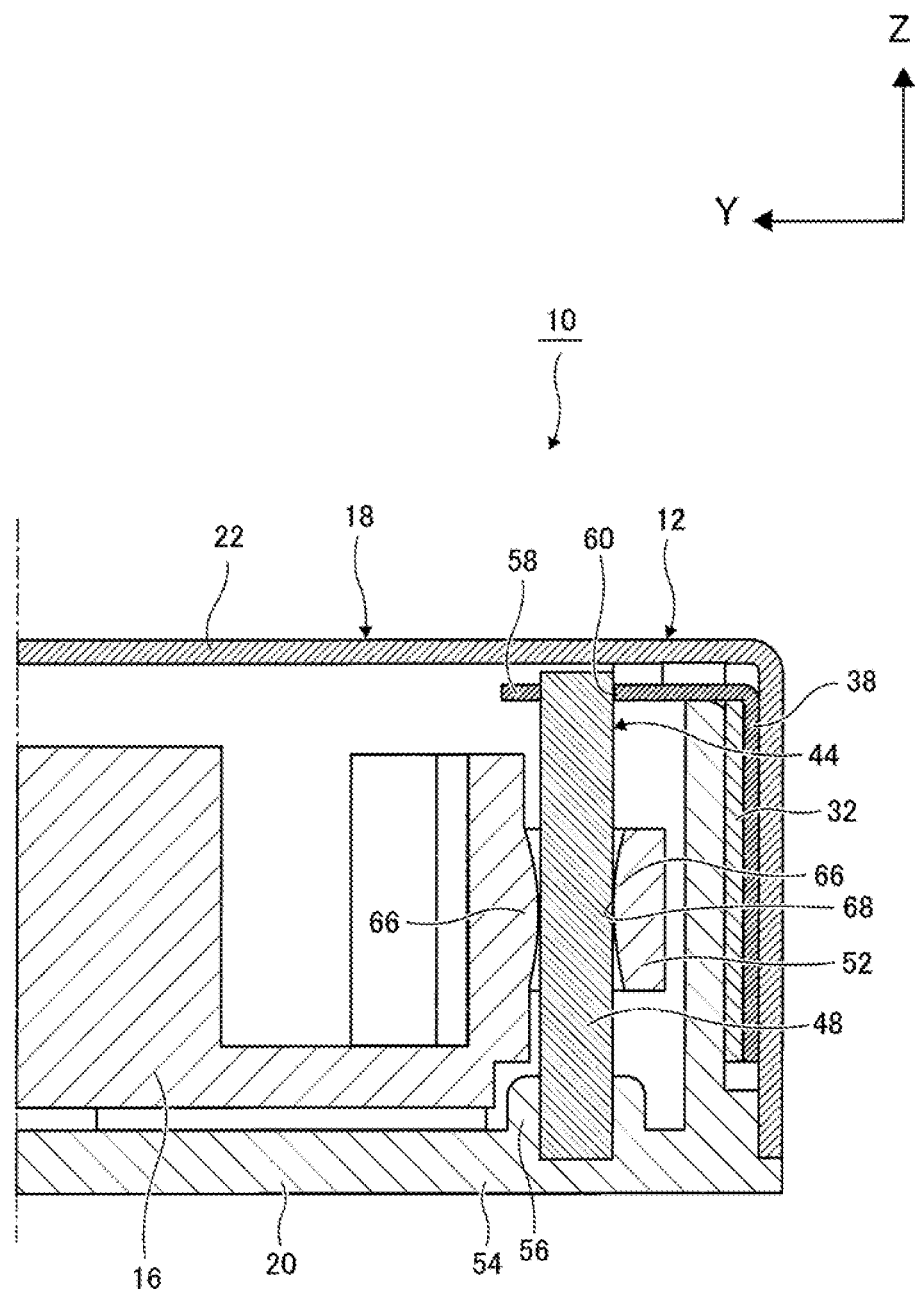
FIG. 7 is a sectional view for illustrating the camera device according to the first embodiment of the present invention, which is taken along the line D-D of FIG. 3.

That is, as illustrated in FIG. 5 to FIG. 7, a bottom surface portion 54 is formed around the through hole 24 of the base 20, and lower fixing portions 56 and 56 are formed on both sides on the inner side of the bottom surface portion 54 as cylindrical pits. Lower ends of the first support member 46 and the second support member 48 are inserted and fixed to the lower fixing portions 56 and 56. Further, upper ends of the above-mentioned magnetic member 38 at both ends in the X direction are bent in the Y direction to form upper fixing portions 58 and 58. Upper ends of the first support member 46 and the second support member 48 are inserted and fixed to insertion holes 60 and 60 formed in the upper fixing portions 58 and 58 so that the first support member 46 and the second support member 48 are fixed to the frame 18. In the first embodiment, the magnetic member 38 also has a support function for the first support member 46 and the second support member 48, and thus the number of components can be reduced as compared to a case in which components for support are separately provided. Further, the first support member 46 and the second support member 48 can be stably supported.

In the above-mentioned first embodiment, the first support member 46 and the second support member 48 are inserted and fixed to the lower fixing portions 56 and 56 and the insertion holes 60 and 60 of the magnetic member 38, but the lower fixing portions 56 and 56 or the insertion holes 60 and 60 may be formed slightly large, and at least one of the first support member 46 or the second support member 48 may be provided to have a slight gap with respect to the lower fixing portions 56 and 56 or the insertion holes 60 and 60 so as to deal with a case in which the first support member 46 or the second support member 48 is misaligned. Further, the lower fixing portions 56 and 56 or the upper fixing portions 58 and 58 may have elasticity.

As illustrated in FIG. 5 and FIG. 6, the first guide portion 50 includes a first contact portion 62 and a second contact portion 64 formed away from each other in the Z direction. In the first embodiment, as illustrated in FIG. 3, the first contact portion 62 and the second contact portion 64 are formed as circular holes, and are brought into contact with an outer surface of the first support member 46 in a 360-degree circumferential direction in the XY-direction cross section of the first support member 46.

Figure 3:
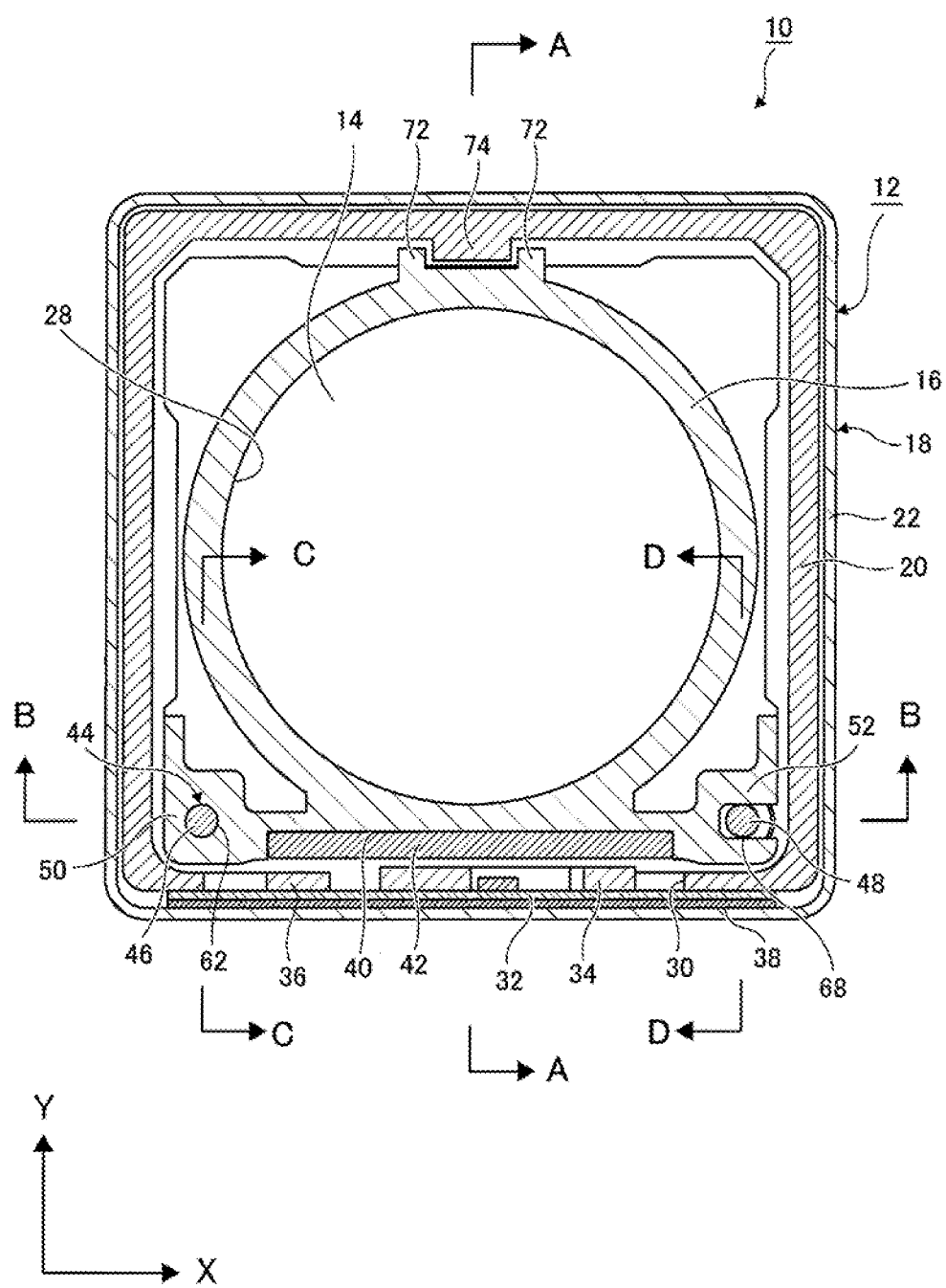
FIG. 3 is a sectional view for illustrating the camera device according to the first embodiment of the present invention, which is taken along a plane.
Figure 4:
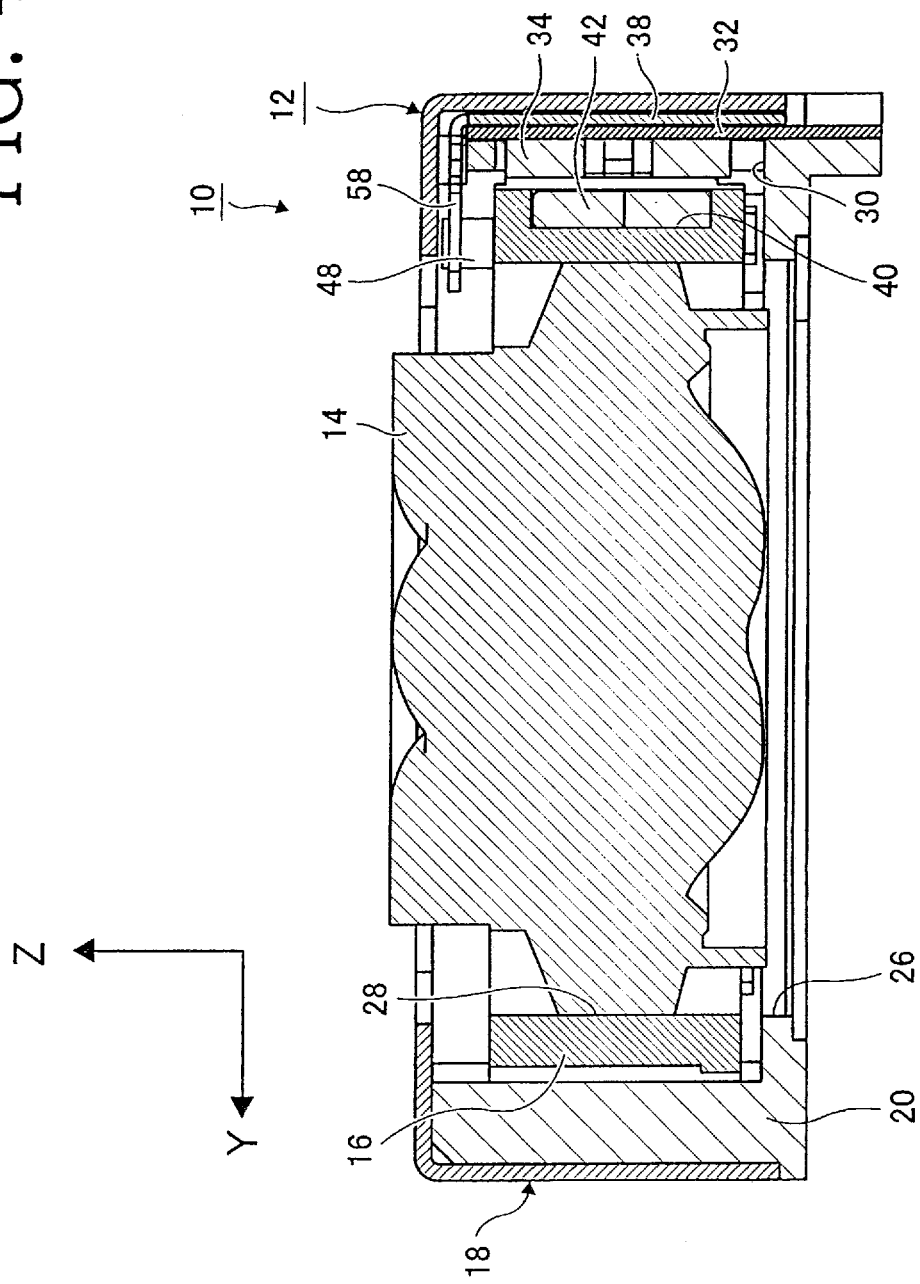
FIG. 4 is a sectional view for illustrating the camera device according to the first embodiment of the present invention, which is taken along the line A-A of FIG. 3.
Figure 8:
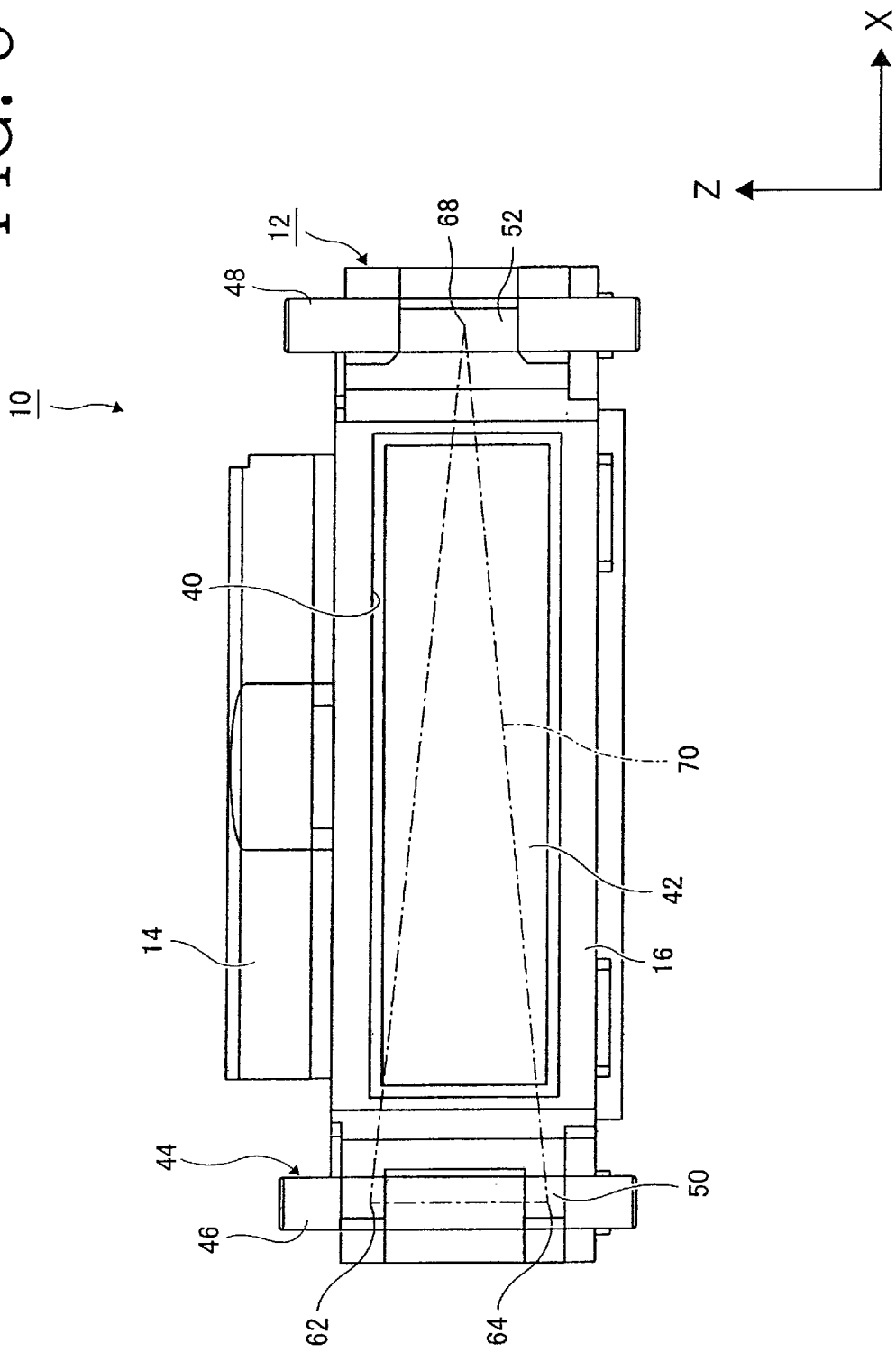
FIG. 8 is a side view for illustrating the camera device according to the first embodiment of the present invention, in which a frame is removed.
Figure 9:
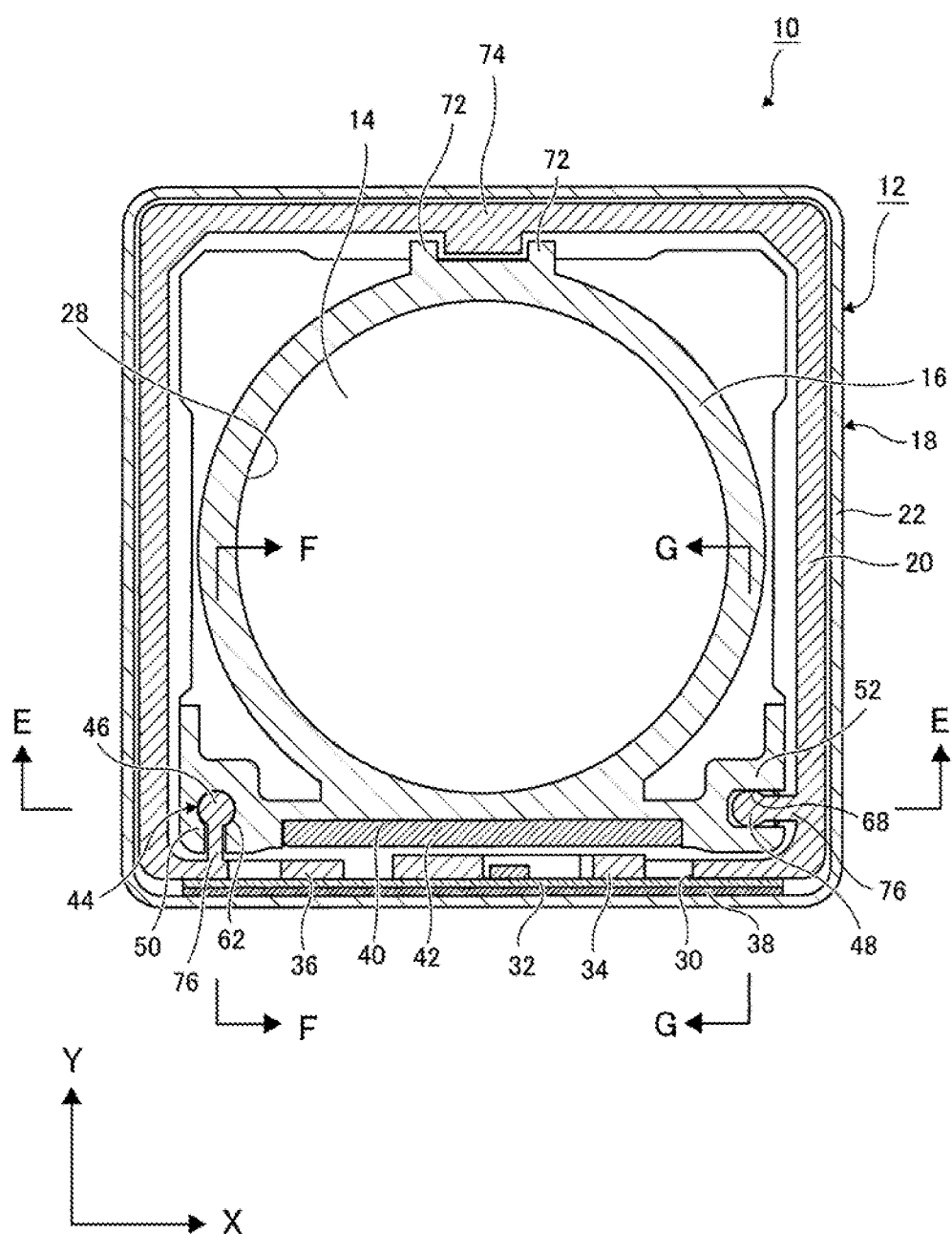
FIG. 9 is a sectional view for illustrating a camera device according to a second embodiment of the present invention, which is taken along a plane.
Figure 10:
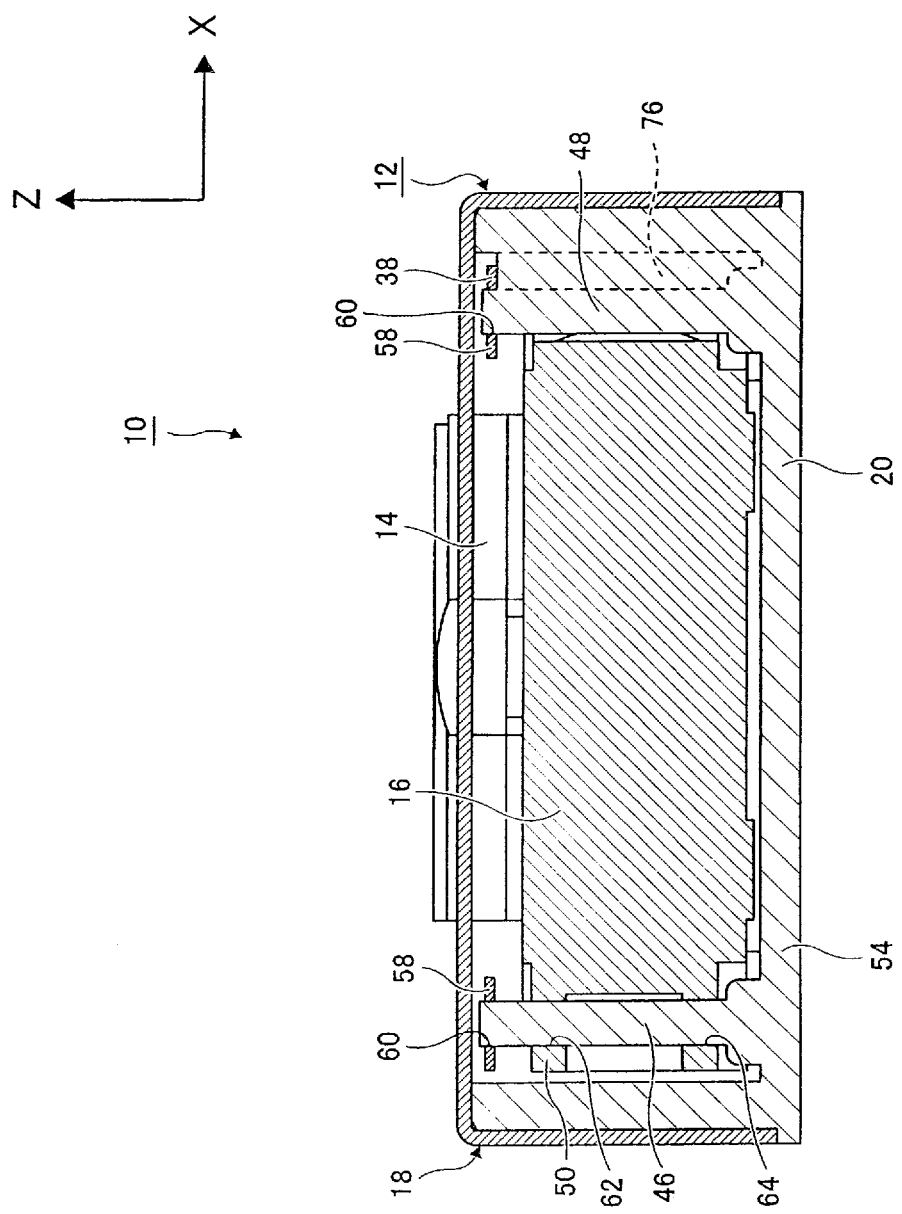
FIG. 10 is a sectional view for illustrating the camera device according to the second embodiment of the present invention, which is taken along the line E-E of FIG. 9.
Figure 11:
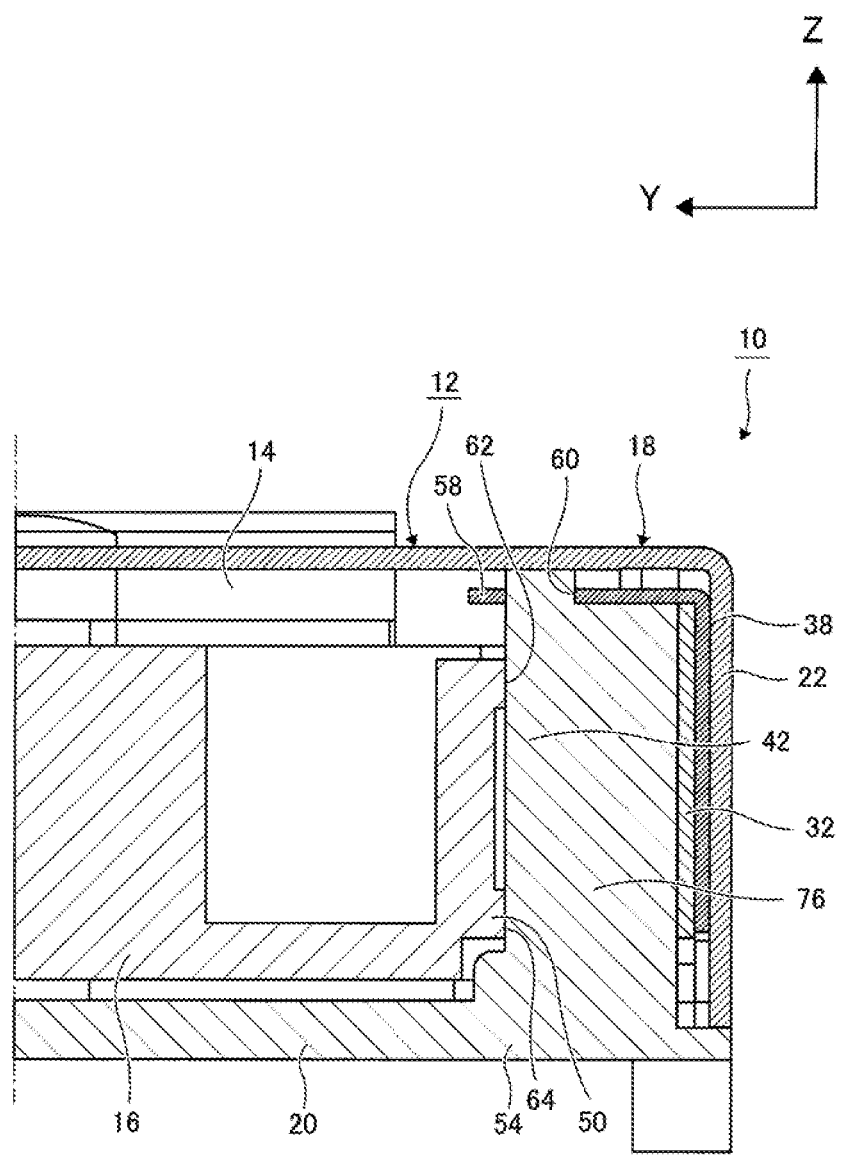
FIG. 11 is a sectional view for illustrating the camera device according to the second embodiment of the present invention, which is taken along the line F-F of FIG. 9.
Figure 12:
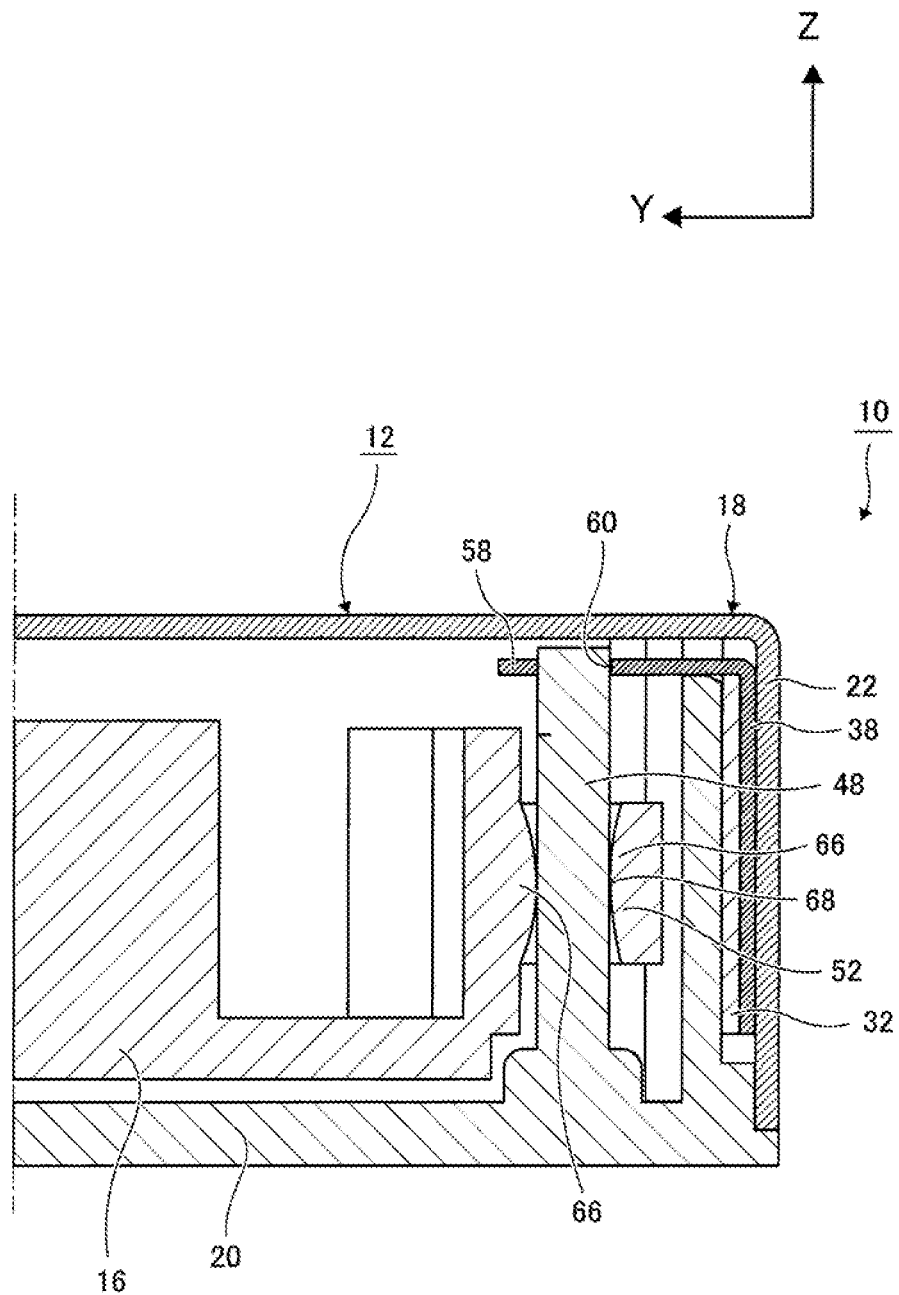
FIG. 12 is a sectional view for illustrating the camera device according to the second embodiment of the present invention, which is taken along the line G-G of FIG. 9.
Figure 13:
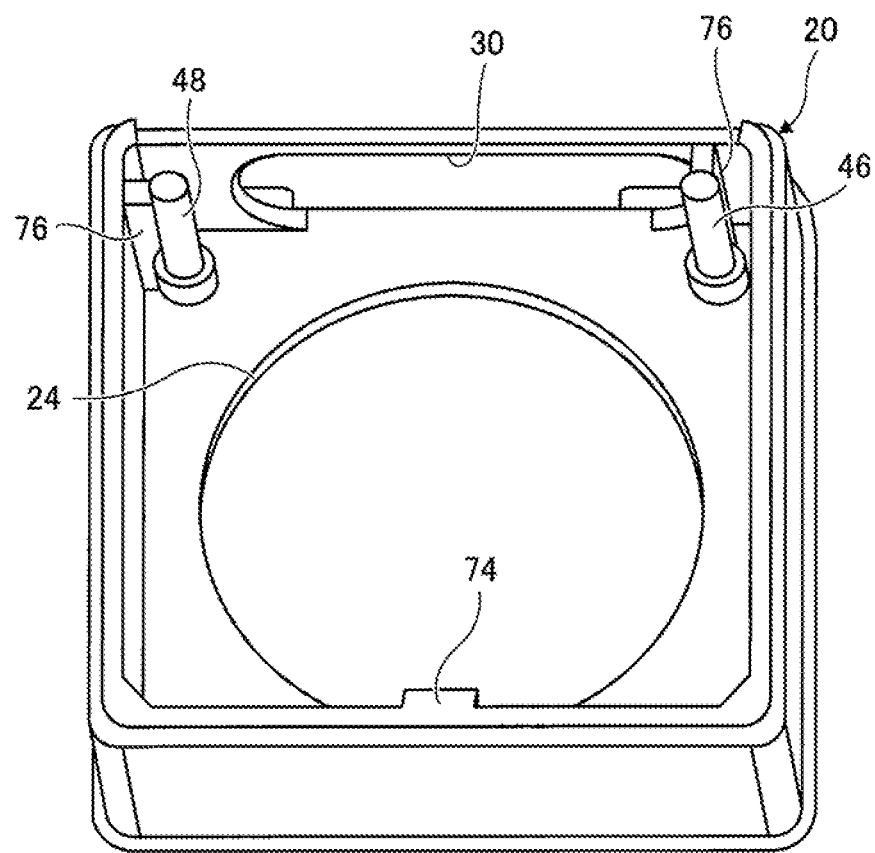
FIG. 13 is a perspective view for illustrating a base used in the camera device according to the second embodiment of the present invention.
Figure 14:
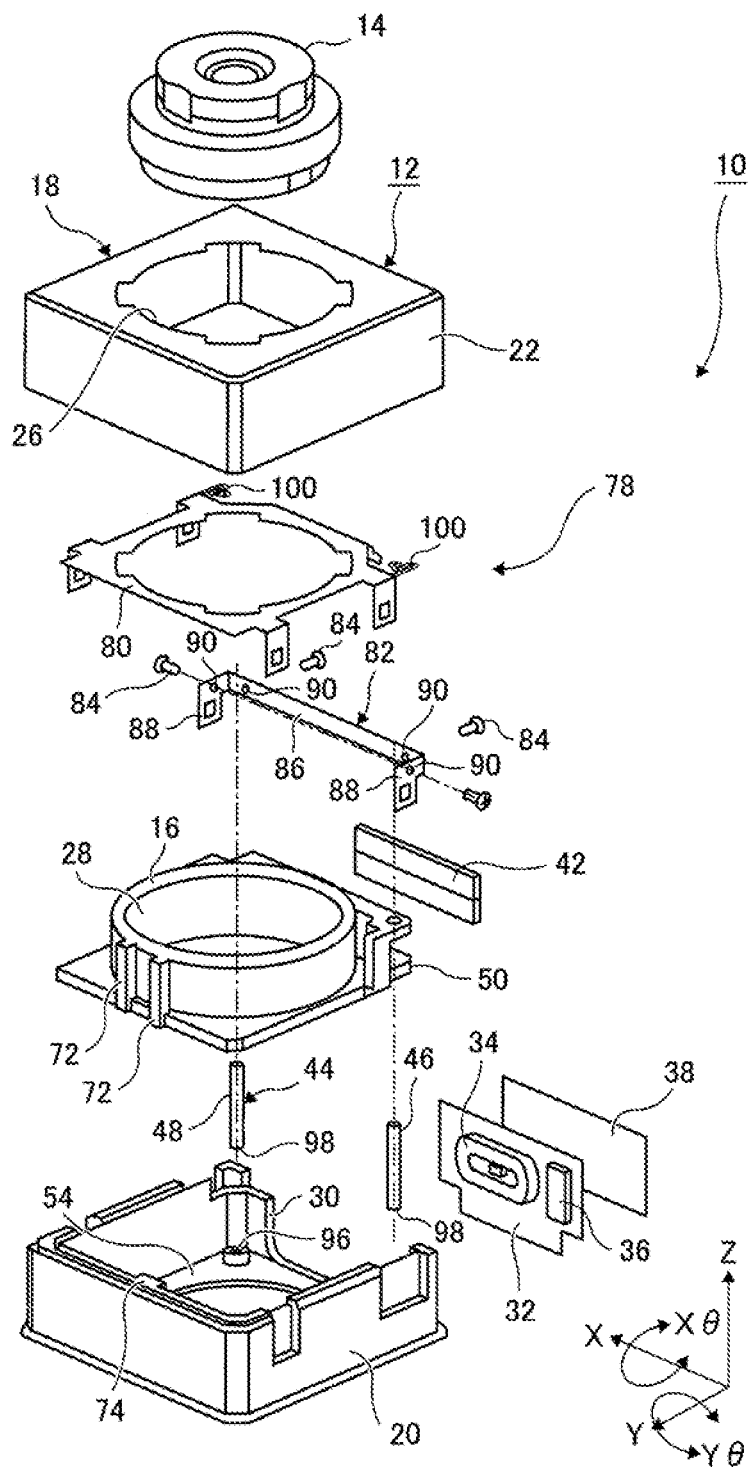
FIG. 14 is an exploded perspective view for illustrating a camera device according to a third embodiment of the present invention as viewed obliquely from above.
Figure 15:
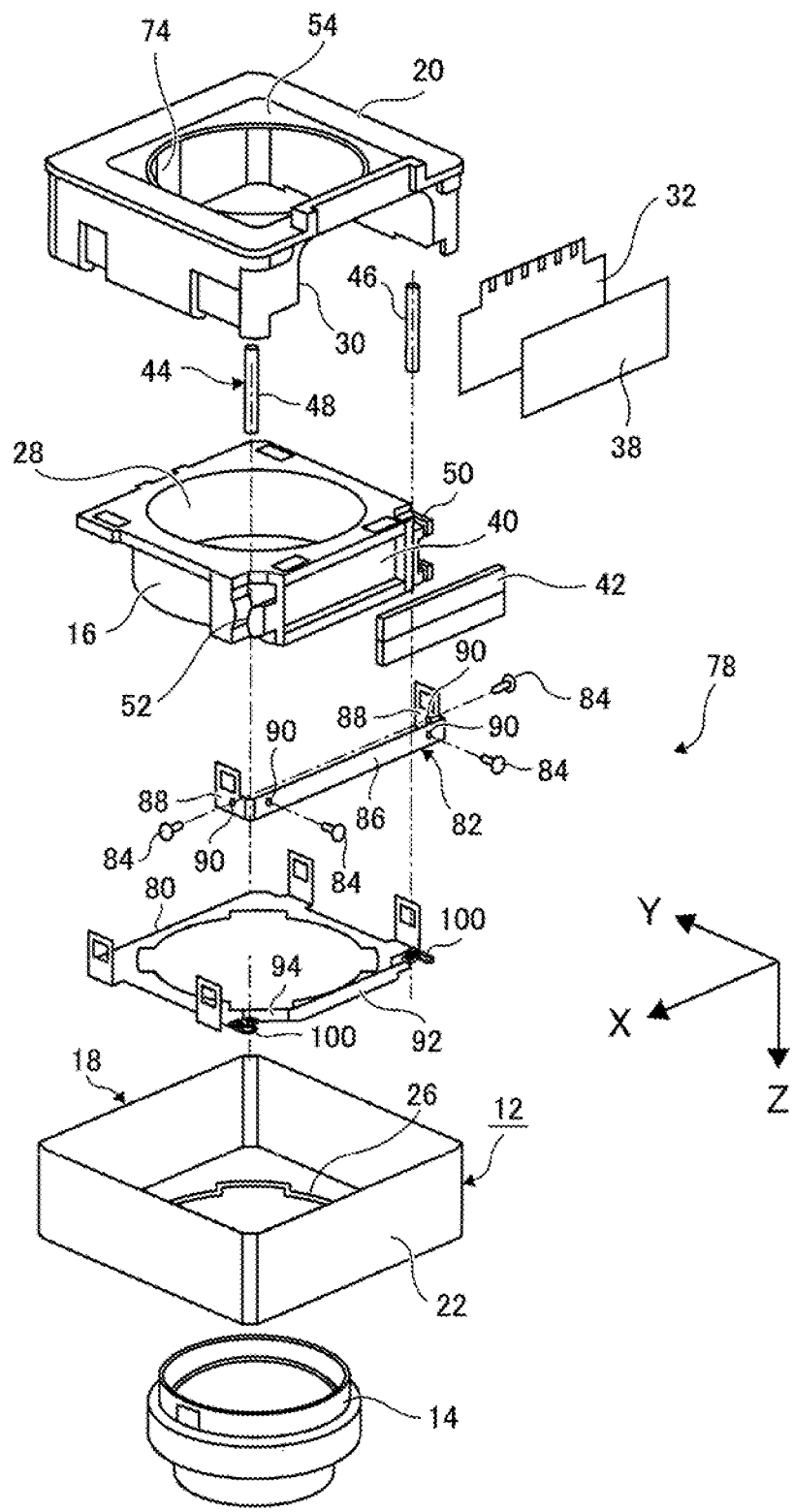
FIG. 15 is an exploded perspective view for illustrating the camera device according to the third embodiment of the present invention as viewed obliquely from below.
Figure 16:
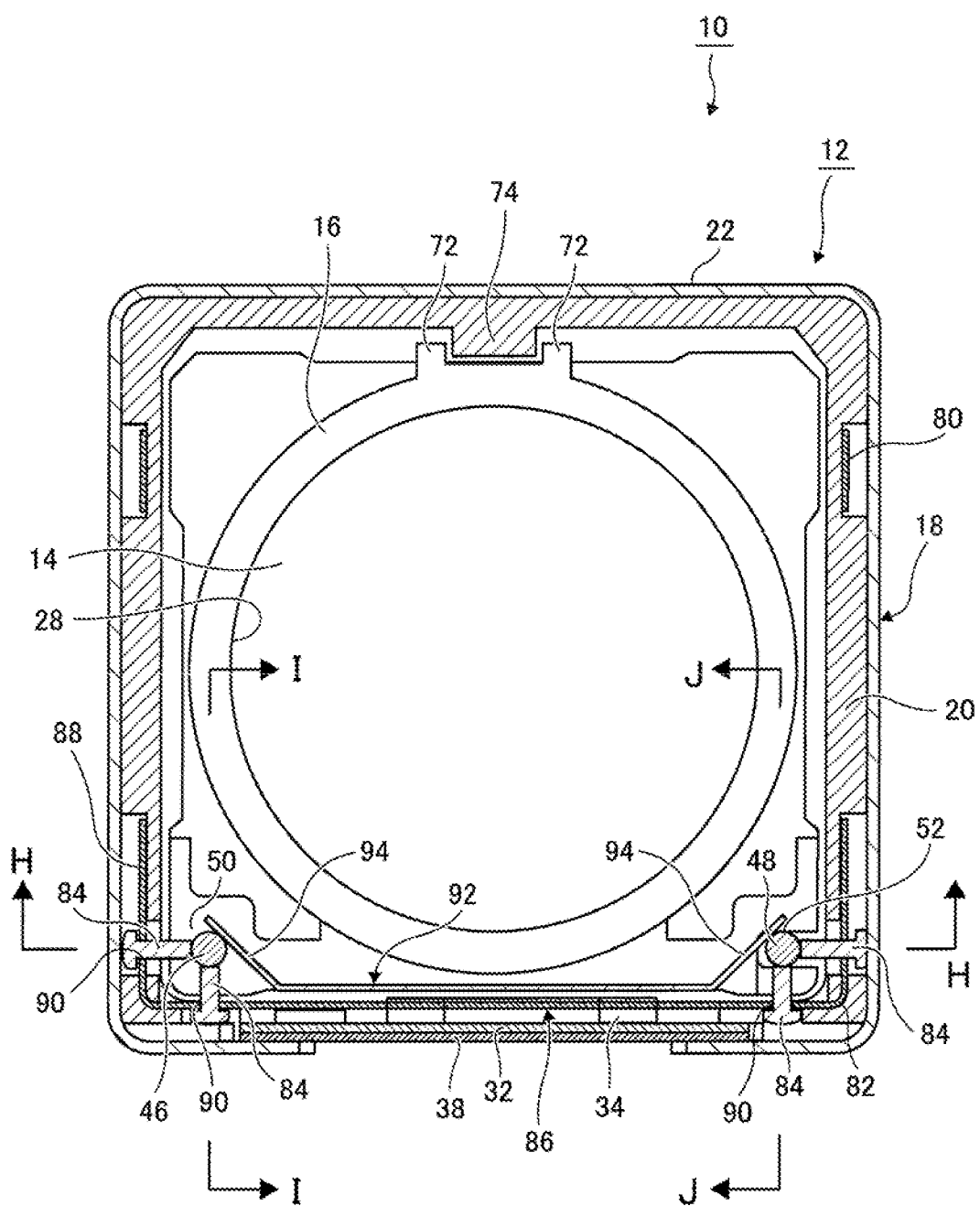
FIG. 16 is a sectional view for illustrating the camera device according to the third embodiment of the present invention, which is taken along a plane.

As illustrated in FIG. 3, in the XY-direction cross section, the second guide portion 52 is formed of two wall surfaces opposed to each other in the Y direction. As illustrated in FIG. 7, both the wall surfaces of the second guide portion 52 protrude as a curve toward the second support member 48 to form protruding portions 66 and 66. Middles of the protruding portions 66 and 66 correspond to a third contact portion 68 that is brought into contact with the second support member 48. The third contact portion 68 is brought into contact with the second support member 48 at two points in the Y direction to reduce a frictional resistance. As illustrated in FIG. 8, the third contact portion 68 is positioned between the first contact portion 62 and the second contact portion 64 in the Z direction (in the first embodiment, at the middle of the first contact portion 62 and the second contact portion 64).

The lens holder 16 is supported by three points of the first contact portion 62, the second contact portion 64, and the third contact portion 68. Therefore, the lens driving device 12 can deal with slight misalignment that may occur in the first support member 46 and the second support member 48. Further, as indicated by the dashed-dotted line in FIG. 8, the first contact portion 62, the second contact portion 64, and the third contact portion 68 form an imaginary triangle 70 (in the first embodiment, an isosceles triangle). A position of the center of gravity of this triangle 70 in the Z direction is in the vicinity of the center of the magnet 42 in the Z direction. As described later, a Lorentz force that is generated when an electric current flows through the coil 34 acts on the magnet 42. Thus, when the magnet 42 is arranged so as to include the position of the center of gravity of the triangle formed by the first contact portion 62, the second contact portion 64, and the third contact portion 68, a force to be applied in a direction of inclining the first support member 46 and the second support member 48 can be reduced, and thus the lens holder 16 can be smoothly moved.

As illustrated in FIG. 1 and FIG. 3, the lens holder 16 is formed with two engaging portions 72 and 72 so as to linearly extend in the Z direction on the opposite side of the magnet in the Y direction. Further, the base 20 has an engaged portion 74 formed so as to be engaged between the engaging portions 72 and 72 and to linearly extend in the Z direction. With the engaging portions 72 and 72 and the engaged portion 74, unnecessary rotation around the optical axis can be prevented. A slight gap in the Y direction is formed between the engaged portion 74 and an end surface of the base 20 between the engaging portions 72 and 72. The first support member 46 and the second support member 48 maintain contact with the first guide portion 50 and the second guide portion 52 at least at two points in the Y direction, and hence the lens holder 16 hardly moves even when the lens holder 16 receives impact from the outside. Further, the first support member 46 and the second support member 48 extend in the Z direction, and hence the lens holder 16 is prevented from receiving damage by a local force even when the lens holder 16 moves so as to return to the frame 18 side.

In the above-mentioned configuration, when the coil 34 arranged in a space between the magnet 42 and the magnetic member 38 in which magnetic fluxes are interposed in the Y direction is energized, an electric current flows through the coil 34 in the X direction, and a Lorentz force acts on the coil 34 in the Z direction according to the Fleming's left hand rule. The coil 34 is fixed to the base 20, and hence the lens holder 16 moves in the Z direction while being supported by the support mechanism 44 with a reaction force acting on the magnet 42 serving as a drive force for the lens holder 16.

When the drive force is represented by F, the drive force F can be set as $F>(\mu1\times N1+\mu2\times N2)+W$, where N represents an attraction force obtained by the magnet ($N=N1+N2$), $\mu1$ represents a friction coefficient between the first support member and the first guide portion, $\mu2$ represents a friction coefficient between the second support member and the second guide portion, and W represents a total weight of a movable member (lens and lens holder).

When the energization to the coil 34 is stopped, the lens holder 16 stops at a position at which the energization is stopped due to the attraction force of the magnet 42, the friction between the first support member 46 and the first guide portion 50, and the friction between the second support member 48 and the second guide portion 52.

In this case, it is assumed that the camera device 10 is subjected to, for example, an impact in a −Y direction. When the camera device 10 is subjected to an impact in the −Y direction, the lens holder 16 attempts to move in a +Y direction against the attraction force of the magnet 42. However, the lens holder 16 hardly moves even when being subjected to an impact from the outside because the first guide portion 50 and the second guide portion 52 maintain the contact in the Y direction without separating from the first support member 46 and the second support member 48. After being subjected to the impact, the lens holder 16 is applied with a force of returning the lens holder 16 in the −Y direction due to the attraction force of the magnet 42. Also in this case, the lens holder 16 hardly moves even when being subjected to an impact from the outside because the first guide portion 50 and the second guide portion 52 maintain the contact in the Y direction with the first support member 46 and the second support member 48.

In this case, even when the first guide portion 50 or the second guide portion 52 is slightly deformed, the first support member 46 and the second support member 48 have a shape extending in the Z direction, and hence a force that is not local but successive acts along the Z direction on the first support member 46 and the second support member 48. Therefore, abrupt motion change due to a reciprocating motion of the lens holder 16 or the like does not occur.

FIG. 9 to FIG. 13 are illustrations of a camera device 10 according to a second embodiment of the present invention.

The second embodiment differs from the above-mentioned first embodiment in that the first support member 46 and the second support member 48 are formed integrally with the base 20, and further ribs 76 and 76 are used for reinforcement.

That is, the first support member 46 and the second support member 48 are formed so that the lower ends of the first support member 46 and the second support member 48 extend in the Z direction from the bottom surface portion 54 of the base 20 integrally with the base 20. Further, the first support member 46 is connected and fixed by the rib 76 extending in the Y direction from a side surface portion of the base 20 integrally with the base 20. The second support member 48 is connected and fixed by the rib 76 extending in the X direction from a side surface portion of the base 20 integrally with the base 20. The first support member 46 and the second support member 48 are connected and fixed by the ribs 76 and 76 extending in different directions, and hence the first support member 46 and the second support member 48 are strong against impact from the outside.

Similarly to the above-mentioned first embodiment, the upper ends of the first support member 46 and the second support member 48 are inserted and fixed to the insertions holes 60 formed in the upper fixing portions 58 of the magnetic member 38.

In the second embodiment, the first support member 46 and the second support member 48 are formed integrally with the base 20. Further, when the base 20 is made of a resin and is formed with use of a mold, the mold can be released in the Z direction. However, it is required to employ other designs such as forming the opening 30 into a cutout shape.

In the first embodiment, the first guide portion 50 is a through hole having a circular shape in cross section, but in order to avoid the rib 76, the first guide portion 50 has a cutout that is opening and extending in the Y direction from a Y-direction end of the through hole. It is desired that the width of the rib 76 be smaller than the diameter of the columnar first support member 46. That is, in this manner, at least a part of an outer surface of the first support member 46 includes at least a part of a circle of 180 degrees or more. Then, the first guide portion 50 is brought into contact with the first support member 46 at least at 180 degrees or more. As a result, even when impact is applied from the outside, the first guide portion 50 is not disengaged and separated from the first support member 46. Further, the second guide portion 52 can be formed so as to have the same shape as the second guide portion 52 in the first embodiment because the rib 76 is formed so as to extend in the X direction. Also in this case, the width of the rib 76 has a dimension that is equal to or smaller than the diameter of the second support member 48. With such a configuration, effects similar to those in the first embodiment can be obtained also in the second embodiment.

Structural members similar to those in the first embodiment are denoted by the same reference symbols, and description thereof is omitted here.

FIG. 14 to FIG. 22 are illustrations of a camera device 10 according to a third embodiment of the present invention.

The third embodiment differs from the above-mentioned first embodiment in that there is provided an adjuster 78 configured to adjust inclination angles of the first support member 46 and the second support member 48 with respect to the frame 18. Further, along with the provision of the adjuster 78, the magnetic member 38 is not required to have the support function, and thus is merely a flat plate in the third embodiment.

That is, the adjuster 78 includes a guide plate 80, a pressing force support member 82, and pressing members 84. The guide plate 80 has a shape fitting to the outer side of the base 20, and is fixed to the base 20. Further, the pressing force support member 82 is fixed to the base 20 on the magnet 42 side. The pressing force support member 82 includes a first plate portion 86 extending in the X direction, and second plate portions 88 and 88 formed at both ends of the first plate portion 86 and bent in the Y direction. Screw holes 90 are respectively formed at four positions of the vicinity of both ends of the first plate portion 86 and the second plate portions 88 and 88.

In the third embodiment, the pressing members 84 are formed as adjusting screws. The pressing members 84 are screwed into the screw holes 90 of the pressing force support member 82 described above. Leading ends of the pressing members 84 are brought into abutment in the X direction and the Y direction right before the upper ends of the first support member 46 and the second support member 48.

The pressing members 84 can be formed of, instead of screws, other means such as cams.

Further, the adjuster 78 includes a pressing force receiving plate 92 extending in the X direction. A center part of the pressing force receiving plate 92 is formed integrally with the guide plate 80. Pressing force receiving portions 94 and 94 are formed at both ends of the pressing force receiving plate 92. The pressing force receiving portions 94 and 94 form substantially 45 degrees with respect to the X direction and the Y direction, and have elasticity. The pressing force receiving portions 94 and 94 abut against the first support member 46 and the second support member 48 so as to form substantially 45 degrees with respect to each pressing member 84 on the opposite side of the pressing member 84 so that the first support member 46 and the second support member 48 are pressed against the pressing member 84.

Figure 17:
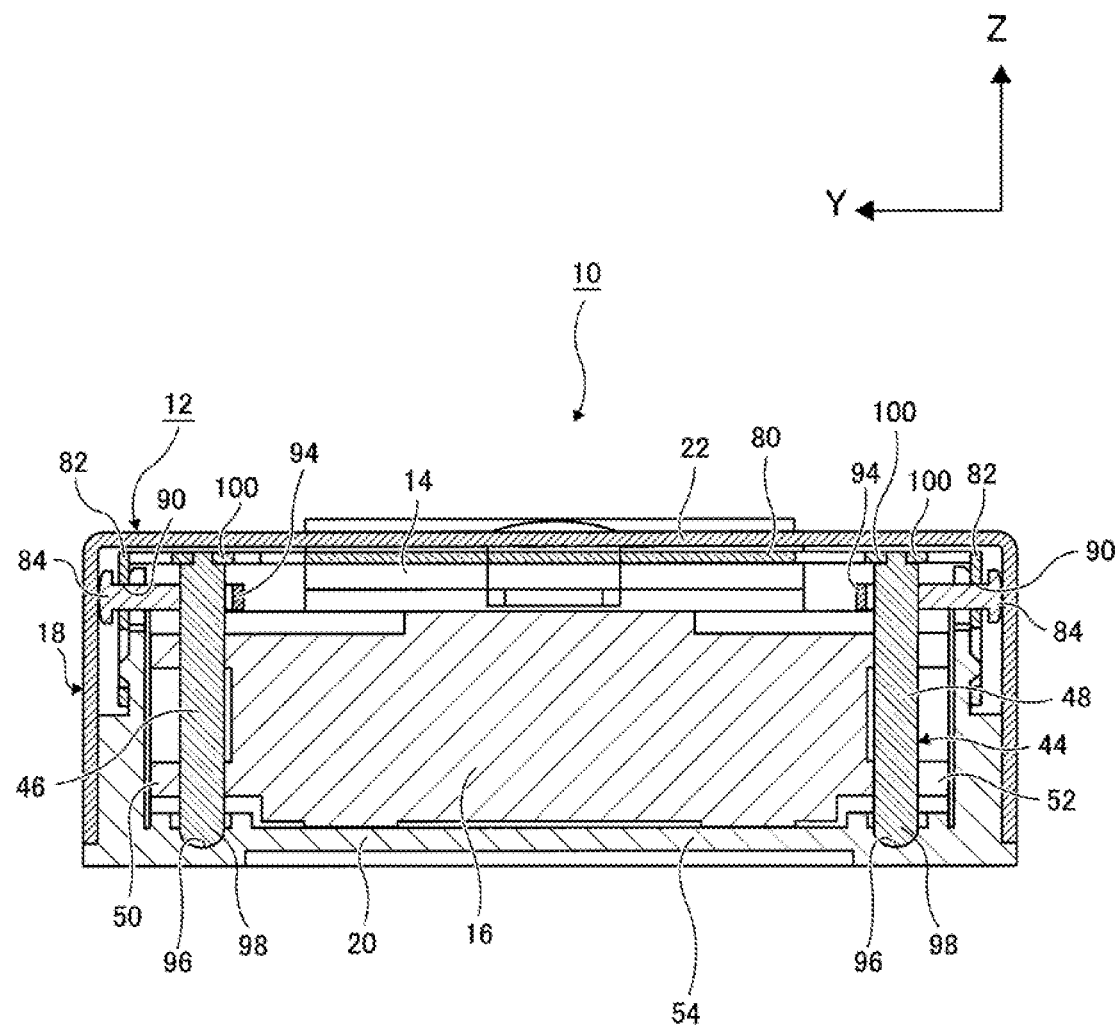
FIG. 17 is a sectional view for illustrating the camera device according to the third embodiment of the present invention, which is taken along the line H-H of FIG. 16.
Figure 18:
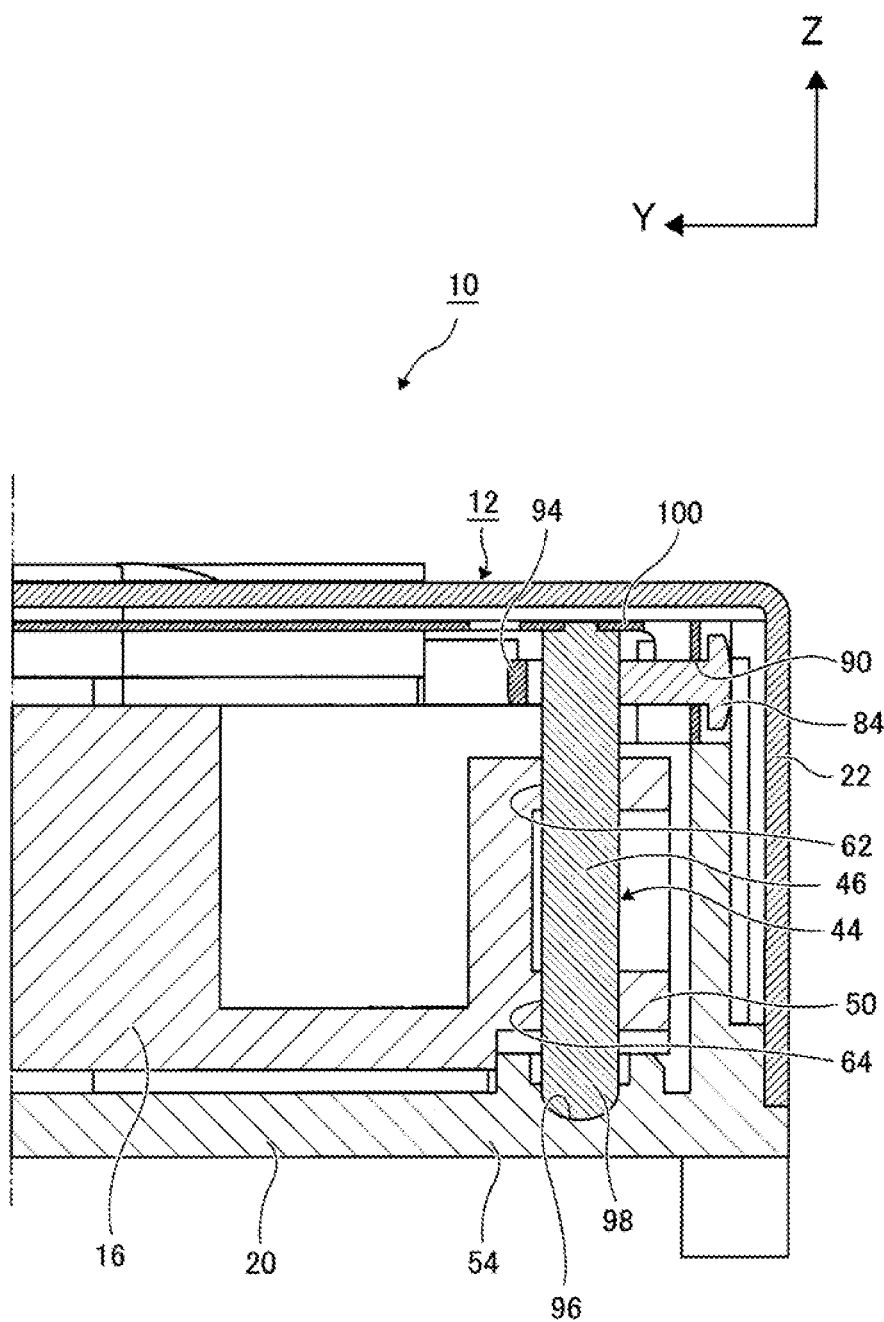
FIG. 18 is a sectional view for illustrating the camera device according to the third embodiment of the present invention, which is taken along the line I-I of FIG. 16.
Figure 19:
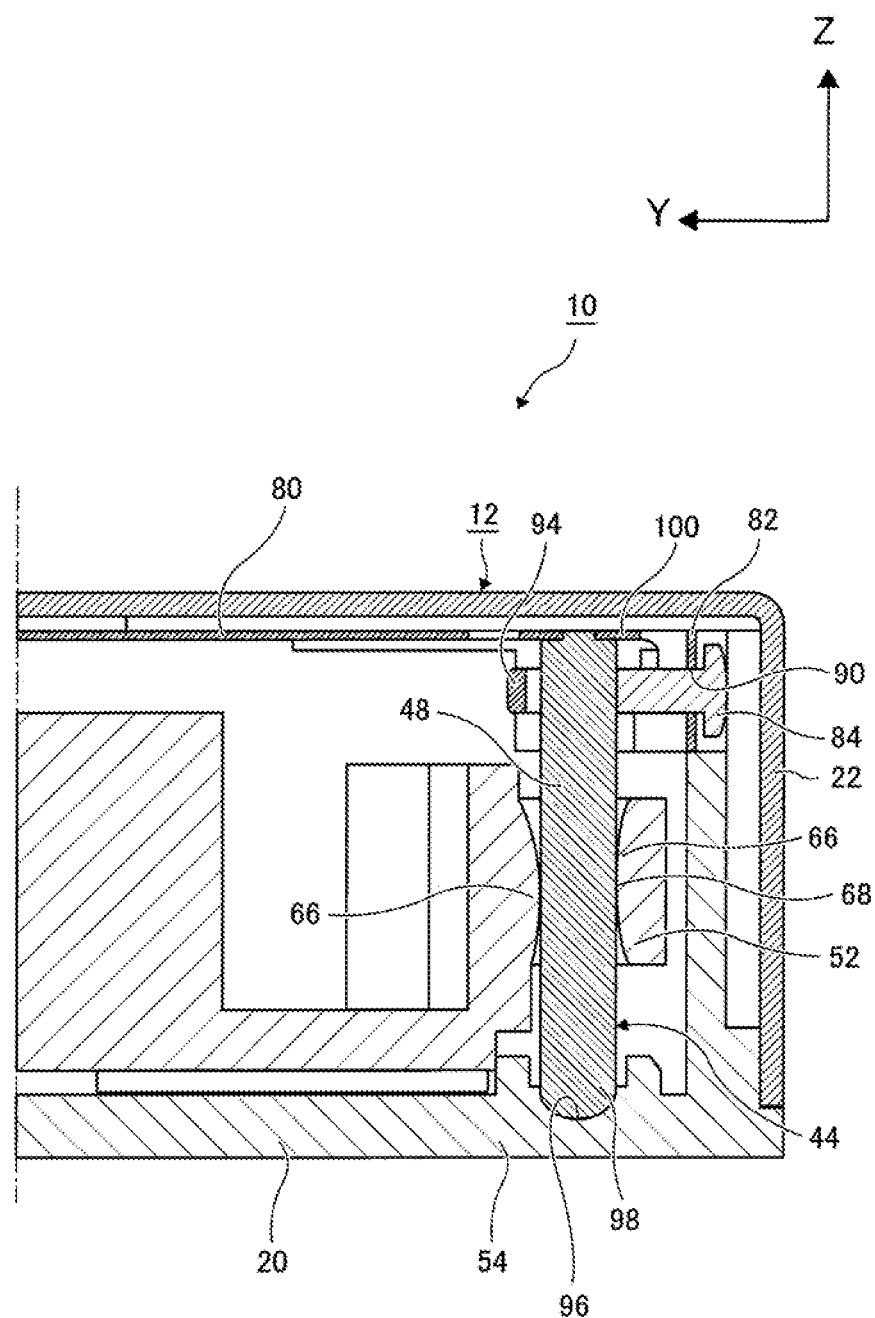
FIG. 19 is a sectional view for illustrating the camera device according to the third embodiment of the present invention, which is taken along the line J-J of FIG. 16.
Figure 20:
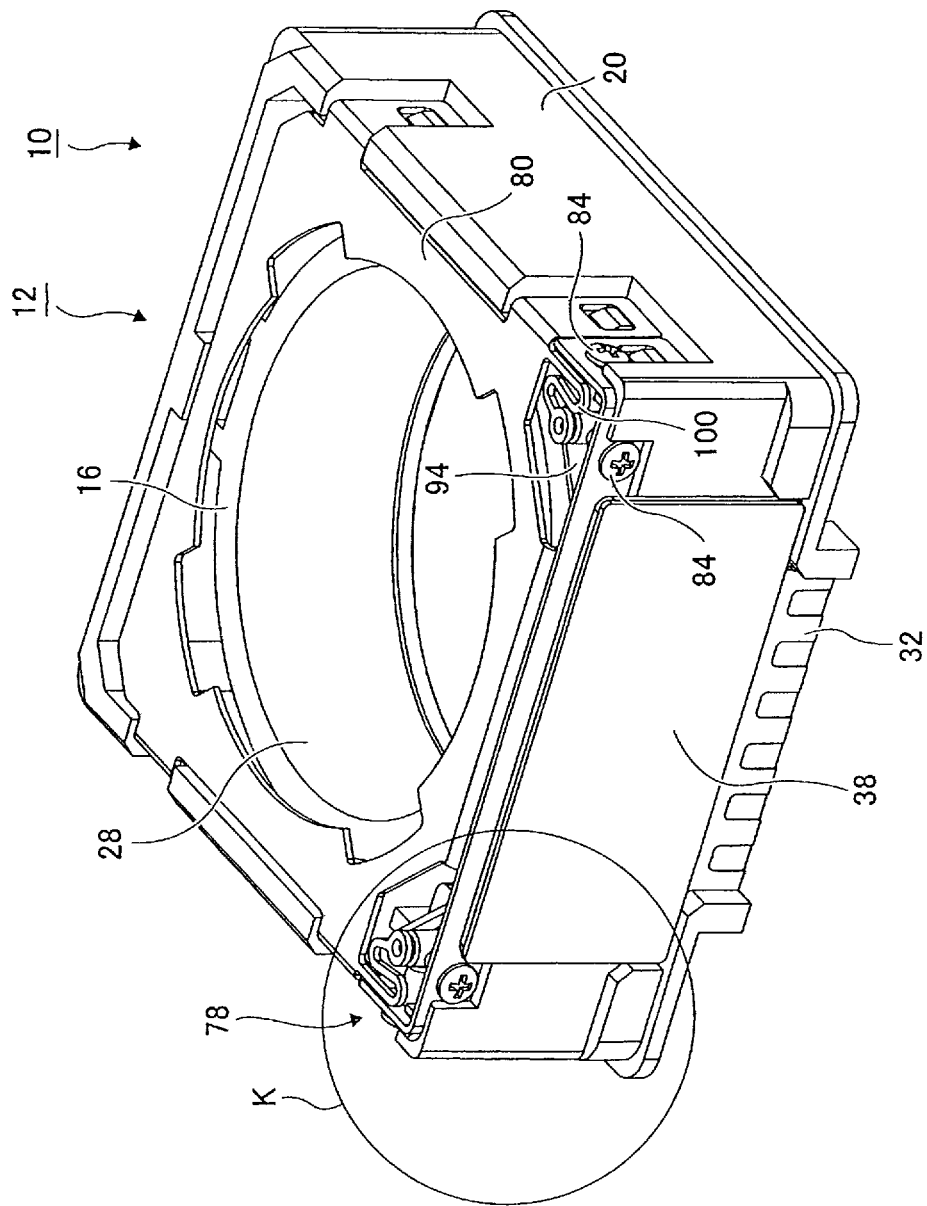
FIG. 20 is a perspective view for illustrating the camera device according to the third embodiment of the present invention, in which a lens and a cover are removed.
Figure 21:
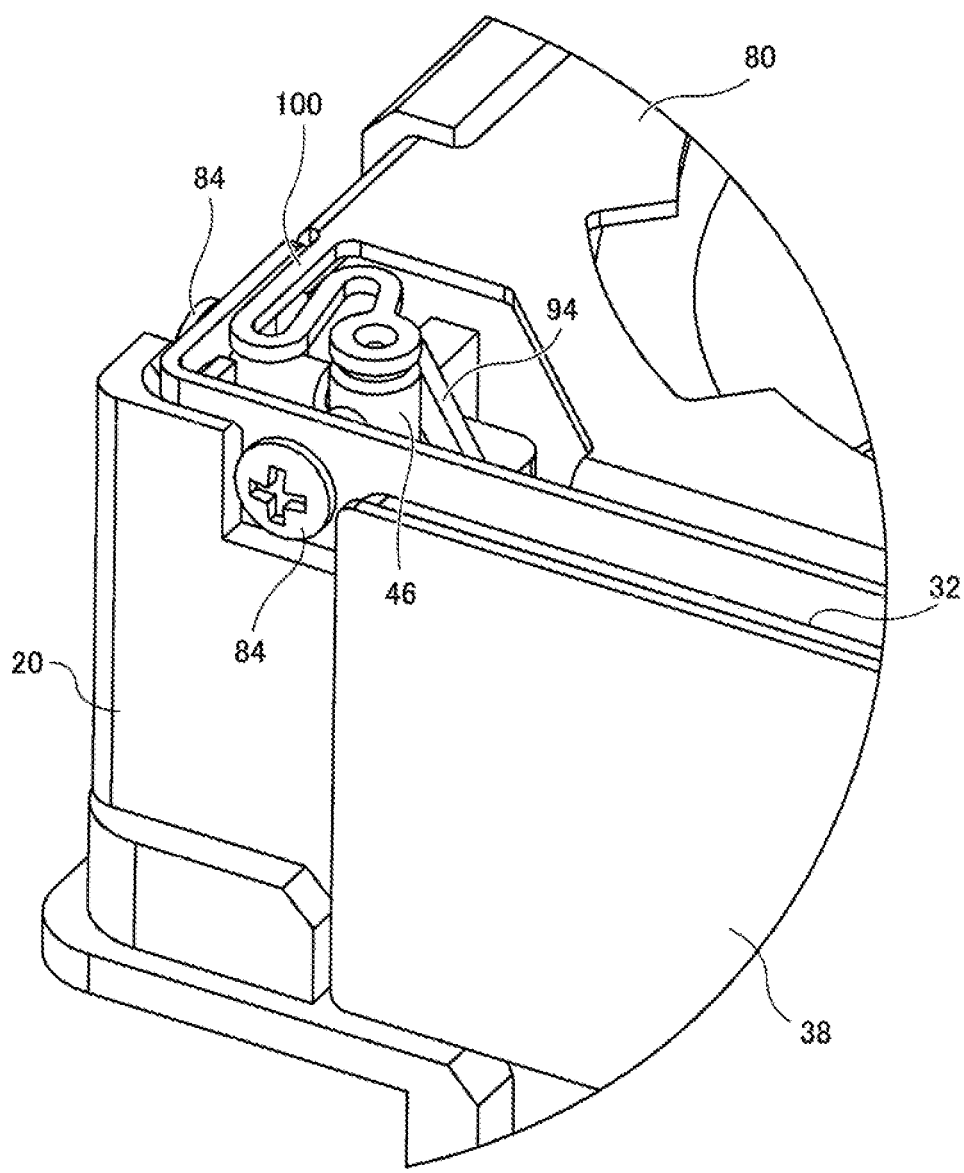
FIG. 21 is an enlarged perspective view for illustrating a part K of FIG. 20 in the camera device according to the third embodiment of the present invention.
Figure 22:
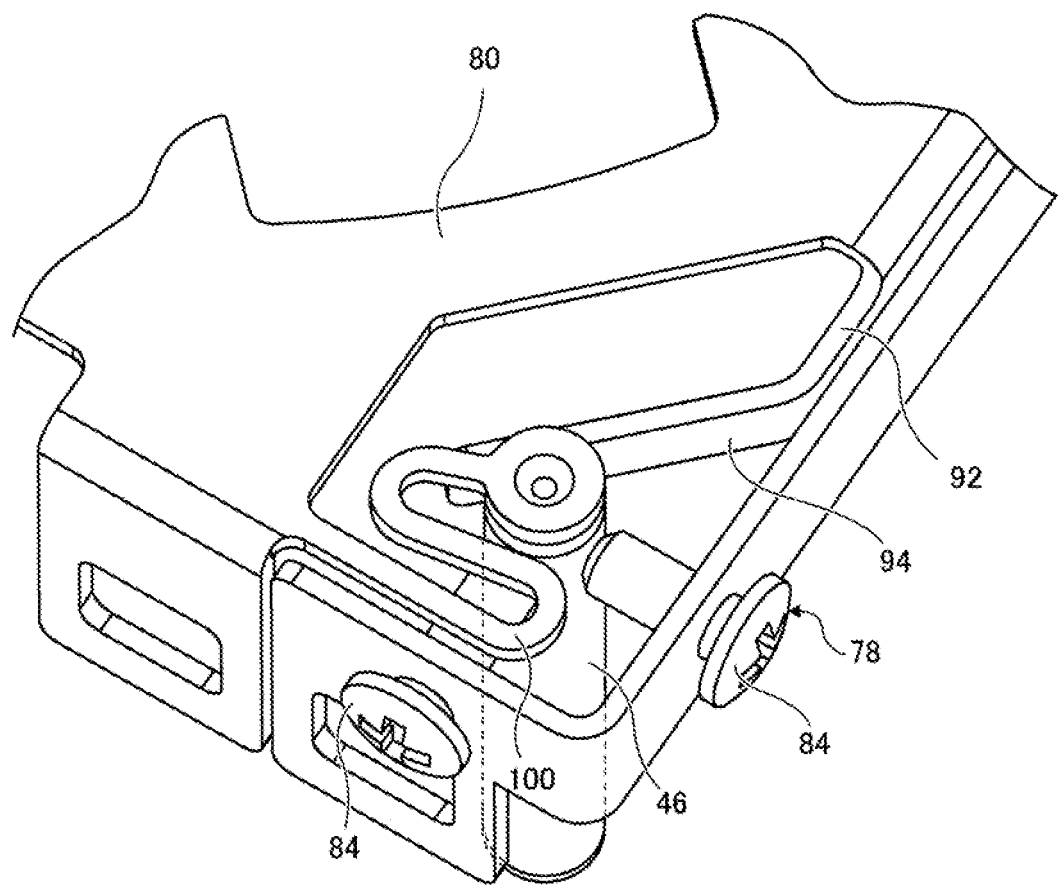
FIG. 22 is a perspective view for illustrating an adjuster used in the camera device according to the third embodiment of the present invention.

Further, as illustrated in FIG. 17 to FIG. 19, the adjuster 78 includes inclination receiving portions 96 and 96. The inclination receiving portions 96 and 96 are formed so as to be recessed in a semi-spherical shape in the inner surface of the bottom surface portion 54 of the base 20 described above. Meanwhile, semi-spherical inclination received portions 98 and 98 are formed at the lower ends of the first support member 46 and the second support member 48. The inclination received portions 98 and 98 are brought into contact with the inclination receiving portions 96 and 96 so as to be fitted thereto. Therefore, the first support member 46 and the second support member 48 can be inclined in X$\theta$ and Y$\theta$ directions with the inclination received portions 98 and 98 serving as fulcrums.

Further, the adjuster 78 includes support spring portions 100 and 100 configured to support the upper ends of the first support member 46 and the second support member 48. In the third embodiment, the support spring portions 100 and 100 are formed integrally with the guide plate 80 which is described above. The support spring portions 100 and 100 are formed so that the support spring portions 100 and 100 can be bent in the X direction and the Y direction, and the upper ends of the first support member 46 and the second support member 48 are fixed to the support spring portions 100 and 100. Therefore, the first support member 46 and the second support member 48 are supported so as to be freely movable by 360 degrees due to the elasticity of the support spring portions 100 and 100.

In the above-mentioned configuration, when the pressing members 84 are rotated, the pressing members 84 are pressed against the pressing force receiving portions 94 and 94, and the first support member 46 and the second support member 48 are inclined against the pressing force receiving portions 94 and 94 in the X$\theta$ and Y$\theta$ direction with the inclination received portions 98 and 98 serving as fulcrums. When the first support member 46 and the second support member 48 are inclined with the inclination received portions 98 and 98 serving as fulcrums, the inclinations of the first support member 46 and the second support member 48 are maintained because the first support member 46 and the second support member 48 are supported by the pressing members 84, the pressing force receiving portions 94 and 94, and the support spring portions 100 and 100.

Such inclination adjustment of the first support member 46 and the second support member 48 is performed, for example, before the lens driving device is shipped. With the adjustment of the inclination of the lens holder 16 with respect to the frame 18, the deviation of the inclination of the lens in the optical axis direction can be reduced. It is desired that, after the adjustment is completed, the inclination receiving portion 96 and the inclination received portion 98 be fixed with an adhesive or the like. Further, it is desired that parts of the first support member 46 and the second support member 48 that are in contact with the pressing members 84 and 84, the pressing force receiving portions 94 and 94, and the support spring portions 100 and 100 also be fixed with an adhesive or the like.

Structural members similar to those in the first embodiment and the second embodiment are denoted by the same reference symbols, and description thereof is omitted here.

The coil 34 and the magnet 42 may be arranged at interchanged positions. In this case, other members are optimally rearranged accordingly. Further, the lens driving device 12 has a focus adjusting function, but may further have a zoom function or an image stabilization function. A lens driving device for use in a camera device is described herein, but the present invention is also applicable to other devices.

The invention claimed is:

1. A lens driving device, comprising:
a tubular lens holder configured to support a lens therein;
a frame that has a base including a bottom plate expanding orthogonal to an optical axis of the lens and a base side wall with an outer surface which base side wall extends parallel to the optical axis of the lens so as to surround a periphery of the lens holder, and a cover including a cover side wall with an inner surface so as to surround around the outer surface of the base side wall;
a magnet mounted on the lens holder;
a coil mounted on the base side wall of the base so as to oppose against the magnet; and
a planar magnetic member mounted on the frame so as to oppose against the magnet with the coil being interposed between the magnet and the planar magnetic member, wherein
the lens holder has a guide passage formed at an outer peripheral portion thereof;
the frame has an elongated support member that has a bottom end being upstanding from the bottom plate, an upper opposite end, and a columnar body extending parallel to the optical axis all the way from the bottom end to the upper opposite end; wherein
the columnar body of the elongated support member is received in the guide passage and is in contact with the guide passage at least at two points in a cross section orthogonal to the optical axis direction of the lens thereby forming a support mechanism that supports the lens holder so as to be freely movable relative to the frame in the optical axis direction of the lens;
the planar magnetic member has an inner side surface that is fixed to the outer surface of the base side wall, an outer side surface that is closely attached to the inner surface of the cover side wall, and an upper fixing portion bent from an upper end of the planar magnetic member; and the upper opposite end of the elongated support member is fixed to the upper fixing portion of the planar magnetic member so as to be supported by the planar magnetic member that is held between the outer surface of the base side wall and the inner surface of the cover side wall at both the inner side surface and the outer side surface of the planar magnetic member.

2. A lens driving device according to claim 1,
wherein the guide passage includes protruding portions each having a curved shape and protruding toward the elongated support member, and
wherein the protruding portions are in contact with the elongated support member.

3. A lens driving device according to claim 1,
wherein the elongated support member includes a first support member and a second support member provided so as to be separated from the first support member in a direction orthogonal to the optical axis direction of the lens, and
wherein the guide passage includes a first guide passage and a second guide passage provided so as to be separated from the first guide passage in the direction orthogonal to the optical axis direction of the lens.

4. A lens driving device according to claim 3,
wherein the first support member and the first guide passage are provided on one side of the coil and the magnet, and the second support member and the second guide passage are provided on another side of the coil and the magnet.

5. A lens driving device according to claim 4,
wherein the first guide passage includes a first contact portion and a second contact portion, which are separated from each other in the optical axis direction of the lens, and are brought into contact with the first support member, and
wherein the second guide passage includes a third contact portion, which is brought into contact with the second support member between the first contact portion and the second contact portion in the optical axis direction of the lens.

6. A lens driving device according to claim 5, wherein the magnet is arranged at a position including a center of gravity of an imaginary triangle formed by the first contact portion, the second contact portion, and the third contact portion.

7. A lens driving device according to claim 3,
wherein at least a part of an outer surface of the first support member includes at least a part of a circle of 180 degrees or more so that the first support member is brought into contact with the first guide passage at least at 180 degrees or more, and
wherein the second support member is brought into contact with the second guide passage at least at two points.

8. A lens driving device according to claim 1, wherein the elongated support member is supported via a rib extending from the frame.

9. A lens driving device according to claim 8, wherein the elongated support member and the rib are formed integrally with the frame.

10. A lens driving device according to claim 8,
wherein the rib includes a plurality of ribs provided in a plurality of elongated support members, and
wherein the plurality of ribs are oriented in different directions in the direction orthogonal to the optical axis direction of the lens.

11. A camera device, comprising:
a lens driving device; and
a lens supported by a lens holder of the lens driving device, wherein
the lens driving device includes:
a tubular tens holder configured to support a lens therein;
a frame that has a base including a bottom plate expanding orthogonal to an optical axis of the lens and a base side wall with an outer surface which base side wall extends parallel to the optical axis of the lens so as to surround a periphery of the lens holder, and a cover including a cover side wall with an inner surface so as to surround around the outer surface of the base side wall;
a magnet mounted on the lens holder;
a coil mounted on the base side wall of the base so as to oppose against the magnet; and
a planar magnetic member mounted on the frame so as to oppose against the magnet with the coil being interposed between the magnet and the planar magnetic member, wherein
the lens holder has a first guide passage and a second guide passage that are formed at outer peripheral portions thereof and are separated from each other in a direction orthogonal to the optical axis direction of the lens;
the frame has a first elongated support member and a second elongated support member each having a bottom end being upstanding from the bottom plate, an upper opposite end, and a columnar body extending parallel to the optical axis all the way from the bottom end to the upper opposite end; wherein
the first guide passage has an upper contact passage and a lower contact passage that are separated from each other in the optical axis direction of the lens;
the second guide passage has an intermediate contact passage formed at a height relatively between the upper contact passage and the lower contact passage in the optical axis direction of the lens;
the columnar body of the first elongated support member is received in the first guide passage and is in contact with the first guide passage at least at two points respectively at the upper contact passage and the lower contact passage in a cross section orthogonal to the optical axis direction of the lens;
the columnar body of the second elongated support is received in the second guide passage and is in contact with the intermediate contact passage at least at two points in a cross section orthogonal to the optical axis direction of the lens, thereby forming a support mechanism that supports the lens holder so as to be freely movable relative to the frame in the optical axis direction of the lens;
the planar magnetic member has an inner side surface that is fixed to the outer surface of the base side wall, an outer side surface that is closely attached to the inner surface of the cover side wall, and an upper fixing portion bent from an upper end of the planar magnetic member; and
the upper opposite end of the first elongated support member and the second elongated support member are fixed to the upper fixing portion of the planar magnetic member so as to be supported by the planar magnetic member that is held between the outer surface of the base side wall and the inner surface of the cover side wall at both the inner side surface and the outer side surface of the planar magnetic member.

12. An electronic apparatus, comprising a camera device including a lens driving device; and a lens supported by a lens holder of the lens driving device, wherein the lens driving device including:

a tubular lens holder configured to support a lens therein;

a frame that has a base including a bottom plate expanding orthogonal to an optical axis of the lens and a base side wall with an outer surface which base side wall extends parallel to the optical axis of the lens so as to surround a periphery of the lens holder, and a cover including a cover side wall with an inner surface so as to surround around the outer surface of the base side wall;

a magnet mounted on the lens holder;

a coil mounted on the base side wall of the base so as to oppose against the magnet; and a planar magnetic member mounted on the frame so as to oppose against the magnet with the coil being interposed between the magnet and the planar magnetic member, wherein the lens holder has a first guide passage and a second guide passage that are formed at outer peripheral portions thereof and are separated from each other in a direction orthogonal to the optical axis direction of the lens;

the frame has a first elongated support member and a second elongated support member each having a bottom end being upstanding from the bottom plate, an upper opposite end, and a columnar body extending parallel to the optical axis all the way from the bottom end to the upper opposite end; wherein the first guide passage has an upper contact passage and a lower contact passage that are separated from each other in the optical axis direction of the lens;

the second guide passage has an intermediate contact passage formed at a height relatively between the upper contact passage and the lower contact passage in the optical axis direction of the lens;

the columnar body of the first elongated support member is received in the first guide passage and is in contact with the first guide passage at least at two points respectively at the upper contact passage and the lower contact passage in a cross section orthogonal to the optical axis direction of the lens;

the columnar body of the second elongated support member is received in the second guide passage and is in contact with the intermediate contact passage at least at two points in a cross section orthogonal to the optical axis direction of the lens, thereby forming a support mechanism that supports the lens holder so as to be freely movable relative to the frame in the optical axis direction of the lens;

the planar magnetic member has an inner side surface that is fixed to the outer surface of the base side wall, and an outer side surface that is closely attached to the inner surface of the cover side wall, and an upper fixing portion bent from an upper end of the planar magnetic member; and the upper opposite end of the first elongated support member and the second elongated support member are fixed to the upper fixing portion of the planar magnetic member so as to be supported by the planar magnetic member that is held between the outer surface of the base side wall and the inner surface of the cover side wall at both the inner side surface and the outer side surface of the planar magnetic member.

13. A lens driving device according to claim 1, further comprising a flexible printed board having an inner surface to which the coil is fixed, wherein the planar magnetic member is fixed to the base side wall of the base in a manner that the flexible printed board is held between the planar magnetic member and the base side wall.

* * * * *